(12) United States Patent
Goto et al.

(10) Patent No.: US 11,608,545 B2
(45) Date of Patent: Mar. 21, 2023

(54) CONDUCTIVE SUPPORTING MEMBER AND METHOD FOR PRODUCING THE SAME

(71) Applicants: NGK INSULATORS, LTD., Nagoya (JP); TOHOKU UNIVERSITY, Sendai (JP)

(72) Inventors: Takashi Goto, Sendai (JP); Hirokazu Katsui, Sendai (JP); Naokuni Muramatsu, Nagoya (JP); Takanari Nakajima, Handa (JP)

(73) Assignees: NGK Insulators, Ltd., Nagoya (JP); Tohoku University, Sendai (JP)

(*) Notice: Subject to any disclaimer, the term of this patent is extended or adjusted under 35 U.S.C. 154(b) by 866 days.

(21) Appl. No.: 16/394,026

(22) Filed: Apr. 25, 2019

(65) Prior Publication Data

US 2019/0247950 A1  Aug. 15, 2019

Related U.S. Application Data

(63) Continuation of application No. PCT/JP2017/042582, filed on Nov. 28, 2017.

(30) Foreign Application Priority Data

Dec. 1, 2016 (JP) .............................. JP2016-234067

(51) Int. Cl.
  *C22C 1/04* (2006.01)
  *B22F 3/14* (2006.01)
  (Continued)

(52) U.S. Cl.
  CPC .............. *C22C 1/0425* (2013.01); *B22F 3/14* (2013.01); *B22F 7/06* (2013.01); *B23K 11/31* (2013.01);
  (Continued)

(58) Field of Classification Search
  CPC .. B22F 3/105; B22F 3/14; B22F 7/016; B22F 2003/1051; B22F 2301/10; B22F 7/06;
  (Continued)

(56) References Cited

U.S. PATENT DOCUMENTS 5,981,090 A   11/1999 Ott
2012/0200205 A1   8/2012 Witney
(Continued)

FOREIGN PATENT DOCUMENTS

CN   1212023 A   3/1999
CN   104769140 A   7/2015
(Continued)

OTHER PUBLICATIONS

Extended European Search Report (Application No. 17875124.4) dated Jan. 3, 2020.
(Continued)

*Primary Examiner* — Anthony J Zimmer
*Assistant Examiner* — Dean Mazzola
(74) *Attorney, Agent, or Firm* — Burr Patent Law, PLLC

(57) ABSTRACT

A conductive supporting member includes an outer portion that includes a Cu matrix phase and a second phase dispersed in the Cu matrix phase and containing a Cu—Zr compound and that has an alloy composition represented by Cu-xZr (x is atomic % of Zr and 0.5≤x≤16.7 is satisfied) and an inner portion that is present on an inner side of the outer portion, is formed of a metal containing Cu, and has higher conductivity than the outer portion.

8 Claims, 23 Drawing Sheets

(51) Int. Cl.
  *B22F 7/06* (2006.01)
  *B22F 3/105* (2006.01)
  *B23K 11/31* (2006.01)
  *C22C 9/00* (2006.01)

(52) U.S. Cl.
  CPC .............. *C22C 9/00* (2013.01); *B22F 3/105* (2013.01); *B22F 2003/1051* (2013.01); *B22F 2301/10* (2013.01)

(58) Field of Classification Search
  CPC ......... B23K 11/31; C22C 1/04; C22C 1/0425; C22C 16/00
  See application file for complete search history.

(56) References Cited

U.S. PATENT DOCUMENTS

| | | |
|---|---|---|
| 2015/0225818 A1 | 8/2015 | Goto et al. |
| 2017/0130299 A1 | 5/2017 | Goto et al. |
| 2017/0225261 A1* | 8/2017 | Swank ................. B23K 35/406 |

FOREIGN PATENT DOCUMENTS

| | | |
|---|---|---|
| EP | 2 927 913 A1 | 10/2015 |
| EP | 3 135 780 A1 | 3/2017 |
| JP | H11-197849 A1 | 7/1999 |
| JP | 2007-260686 A1 | 10/2007 |
| JP | 2009-220168 A1 | 10/2009 |
| JP | 2012-162802 A1 | 8/2012 |
| WO | 2010/146702 A1 | 12/2010 |
| WO | 2016/189929 A1 | 12/2016 |

OTHER PUBLICATIONS

Chinese Office Action (Application No. 201780041135.4) dated Apr. 21, 2020 (with English translation).
Naokuni Muramatsu, et al., "Development of High-Electrical-Conductivity and High-Wear-Resistance Hypoeutectic Cu—Zr Alloy SPS Materials," *Journal of the Japan Society of Powder and Powder Metallurgy*, Apr. 9, 2016, vol. 63, No. 3, pp. 132-138.
International Search Report and Written Opinion (Application No. PCT/JP2017/042582) dated Mar. 6, 2018.
English translation of International Preliminary Report on Patentability (Chapter I) (Application No. PCT/JP2017/042582) dated Jun. 13, 2019, 7 pages.

* cited by examiner

10 μm

10 μm

10 μm

View of SEM-EDX analysis

Example 2

CONDUCTIVE SUPPORTING MEMBER AND METHOD FOR PRODUCING THE SAME

BACKGROUND OF THE INVENTION

1. Field of the Invention

The present disclosure, which is the invention disclosed in this specification, relates to a conductive supporting member and a method for producing the conductive supporting member.

2. Description of the Related Art

Known conductive supporting members have been used for welding electrodes with which welding is performed by sandwiching steel or an aluminum alloy to be welded and melting the contact interface through application of a large current within a short time under pressure. For example, such a welding electrode has been proposed that is constituted by facing electrodes, each of which has a heat-transfer interference portion having lower thermal conductivity than the surrounding portion in a central region of a sandwiching surface of the electrode (e.g., refer to PTL 1). There has also been proposed a resistance welding electrode in which an electrode tip formed of a steel mainly made of tungsten is embedded in the tip of a shank (e.g., refer to PTL 2). With this welding electrode, a coated steel sheet having high tensile strength can be subjected to resistance welding.

CITATION LIST

Patent Literature

PTL 1: JP 2009-220168 A
PTL 2: JP 2007-260686 A

SUMMARY OF THE INVENTION

Welding electrodes are sometimes attached to a welding robot arm and used for welding of steel sheets and the like. Such a welding robot arm has a highly conductive electrode tip at its endmost portion, and includes a holder constituting a welding arm and having heat dissipation properties and a shank that is an energizing part interposed between the holder and the electrode tip. Among them, for example, the shank used as a conductive supporting member is required to have higher conductivity to increase the welding efficiency and is also required to have high load strength at high temperatures and high strength and high hardness for long-term durability. Furthermore, in recent years, welding robot arms have been required to have higher conductivity and higher hardness because of, for example, an increase in the number of welding spots. However, such requirements have not sufficiently been satisfied yet and further improvements have been demanded.

A conductive supporting member disclosed in this specification and a method for producing the conductive supporting member are provided to address the above problems. It is a main object to provide a conductive supporting member having higher conductivity and higher hardness.

As a result of thorough studies to achieve the above main object, the present inventors have found that higher conductivity and higher hardness can be achieved by using a composite member that includes copper metal as an electric conductor and that includes, as a high-strength structure, an alloy containing a Cu—Zr compound and disposed on the outer side of the copper metal.

That is, the conductive supporting member disclosed in this specification includes an outer portion that includes a Cu matrix phase and a second phase dispersed in the Cu matrix phase and containing a Cu—Zr compound and that has an alloy composition represented by Cu-xZr (x is atomic % of Zr and $0.5 \leq x \leq 16.7$ is satisfied) and an inner portion that is present on an inner side of the outer portion, is formed of a metal containing Cu, and has higher conductivity than the outer portion.

The method for producing a conductive supporting member disclosed in this specification is a method for producing a conductive supporting member that includes an outer portion and an inner portion that is present on an inner side of the outer portion and that has higher conductivity than the outer portion. The method includes a sintering step of arranging a raw material containing Cu for the inner portion to be formed so as to have higher conductivity than the outer portion, arranging, on an outer side of the raw material for the inner portion, a raw material powder for the outer portion to be formed, the raw material powder being prepared using a powder of Cu and a Cu—Zr master alloy or a powder of Cu and $ZrH_2$ so as to have an alloy composition represented by Cu-xZr (x is atomic % of Zr and $0.5 \leq x \leq 16.7$ is satisfied), holding the mixed powder at a particular temperature lower than a eutectic point while a particular pressure is applied, and performing spark plasma sintering on the mixed powder.

Advantageous Effects of Invention

According to the conductive supporting member disclosed in this specification and the method for producing the conductive supporting member, a conductive supporting member having high conductivity and higher hardness can be provided. The reason for this is assumed to be as follows. For example, in this conductive supporting member, the inner portion is formed of a highly conductive metal containing Cu and the outer portion is formed of a material containing a Cu matrix phase having high strength and a second phase containing a Cu—Zr compound. Thus, high conductivity is achieved on the inner side and high strength and high hardness are achieved on the outer side. Furthermore, in such a method for producing a conductive supporting member, generally, some metal powders have a high reactivity depending on their elements. For example, a Zr powder has a high reactivity with oxygen. When the Zr powder is used as a raw material powder in the air, the handling requires extreme caution. In contrast, a Cu—Zr master alloy powder (e.g., Cu-50 mass % Zr master alloy) and a $ZrH_2$ powder are relatively stable and easily handled even in the air. Through a relatively simple treatment in which such raw material powders are subjected to spark plasma sintering, an outer portion containing a Cu—Zr compound can be produced. Furthermore, since both the outer portion and the inner portion are formed of Cu materials, there is no large difference in sintering temperature. Therefore, the target product can be advantageously obtained through a single spark plasma sintering (SPS) process.

DETAILED DESCRIPTION OF THE INVENTION

Figure 1:
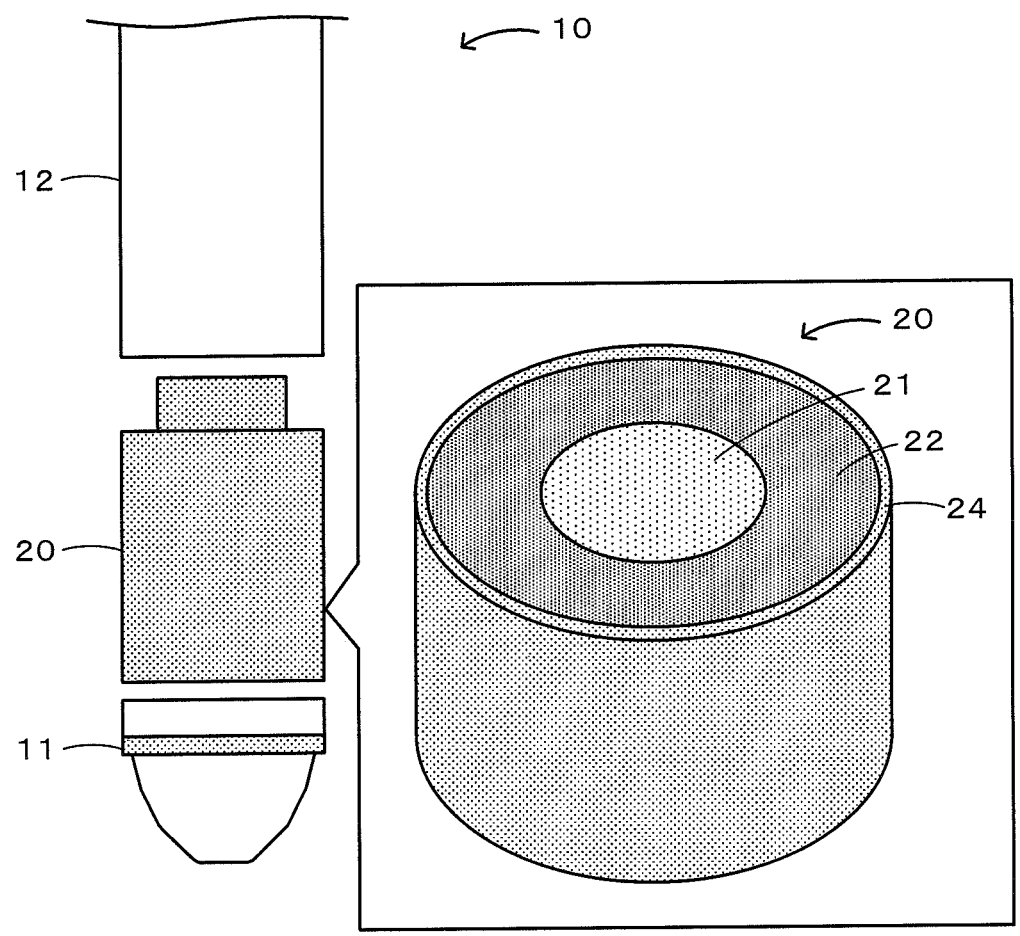
FIG. 1 illustrates an example of a welding arm 10 including a shank 20.

A conductive supporting member disclosed in this specification will be described with reference to the attached drawings. FIG. 1 illustrates an example of a welding arm 10 including a shank 20 that is an example of a conductive supporting member according to this embodiment. The welding arm 10 is used for, for example, welding an object to be welded such as a steel sheet or an aluminum alloy sheet and may be used for, for example, spot welding. The welding arm 10 includes a tip electrode 11 that contacts an object to be welded and melts the object, a holder 12 that is disposed on a base part of a welding robot and subjected to power supply, and a shank 20 that is interposed between the tip electrode 11 and the holder 12, supplies electrical power to the tip electrode 11, and holds the tip electrode 11. The tip electrode 11 is a member required to have conductivity, high thermal stability, and hardness and may be formed of, for example, tungsten, a tungsten alloy, molybdenum, a molybdenum alloy, a Cu—W alloy, a Cu—Cr alloy, or oxygen-free copper (OFC). The receiving member (socket) of the tip electrode is required to have high hardness and may be formed of, for example, a Cu—Be—Co alloy. The holder 12 is a member required to have, for example, high heat dissipation performance, high strength, and high hardness and may be formed of, for example, a Cu—Ni—Be alloy.

The shank 20 is a member required to have, for example, high conductivity, high strength, and high hardness. The shank 20 includes an inner portion 21, an outer portion 22, and a working layer 24. The working layer 24 is not necessarily formed. In this shank 20, a connecting portion (not illustrated) to which the tip electrode 11 is connected and a fitting portion (not illustrated) to which the holder 12 is fitted are formed.

The inner portion 21 is present on the inner side of the outer portion and has higher conductivity than the outer portion. The inner portion 21 is formed of a metal containing Cu. The metal containing Cu may be, for example, Cu metal, CuW, $Al_2O_3$—Cu (alumina dispersed copper), a Cu—Cr alloy, or a Cu—Cr—Zr alloy and is preferably Cu. The inner portion 21 may contain an unavoidable component (e.g., a trace amount of oxygen). The oxygen content is preferably, for example, 700 ppm or less and may be 200 ppm to 700 ppm. Examples of the unavoidable component include Be, Mg, Al, Si, P, Ti, Cr, Mn, Fe, Co, Ni, Zn, Sn, Pb, Nb, and Hf (refer to Table 1). The unavoidable component may be contained in an amount of 0.01 mass % or less relative to the total amount. The conductivity of the inner portion 21 is preferably as high as possible. The conductivity is preferably 80% IACS or more, more preferably 90% IACS or more, and further preferably 95% IACS or more. The conductivity is determined by measuring the volume resistivity of a copper alloy in conformity with JIS-H0505, calculating the ratio of the volume resistivity to the resistivity (0.017241 μΩm) of annealed pure copper, and performing conversion to conductivity (% IACS). The inner portion 21 may have a hardness of about 50 to 80 MHv in terms of Vickers hardness. The inner portion 21 may have higher thermal conductivity than the outer portion 22. The inner portion 21 may have a shape such as a cylinder, a cylindroid, or a polygon (e.g., including a rectangle and a hexagon) or may have a linear shape, a bent shape, or a circular arc shape. The inner portion 21 may be located at the center of the shank 20 or may be shifted from the center of the shank 20.

The outer portion 22 may be a portion having higher hardness and higher mechanical strength (e.g., tensile strength) than the inner portion. The outer portion 22 includes a Cu matrix phase and a second phase that is dispersed in the Cu matrix phase and contains a Cu—Zr compound, and has an alloy composition represented by Cu-xZr (x is atomic % of Zr and 0.5≤x≤16.7 is satisfied). Herein, x may be 15.2 or less or may be 8.6 or less. The outer portion 22 is a high mechanical strength portion with conductivity. In this outer portion 22, the Cu matrix phase and the second phase are separated from each other and the second phase may contain $Cu_5Zr$ as a Cu—Zr compound. The outer portion 22 may also contain an unavoidable component. The outer portion 22 may have a composition obtained by diluting the composition listed in Table 1 so that the Zr content is decreased to 0.5 at % or more and 8.6 at % or less. $Cu_5Zr$ has MHv 585±100 in terms of Vickers hardness. In the alloy composition represented by Cu-xZr of the outer portion 22, x preferably represents 1.0 or more, more preferably 3.0 or more, and further preferably 5.0 or more. Preferably, x is increased, that is, the Zr content is increased because, for example, the mechanical strength and the hardness are further improved. The outer portion preferably has at least one of the following features (1) to (4).
(1) The average grain size D50 of the second phase in sectional view is 1 μm to 100 μm. (2) The second phase has a Cu—Zr compound phase in an outer shell and includes a Zr phase in a central core, the Zr phase having a Zr content higher than that of the outer shell.
(3) The Cu—Zr compound phase serving as the outer shell has a thickness that is 40% to 60% of the radius of a grain, which is the distance between the outermost circumference of the grain and the center of the grain.
(4) The Cu—Zr compound phase serving as the outer shell has a hardness of MHv 585±100 in terms of Vickers hardness, and the Zr phase serving as the central core has a hardness of MHv 310±100 in terms of Vickers hardness.

TABLE 1

| Component | Content(mass %) |
|---|---|
| Zr | 47.0-49.9 |
| Be | <0.01 |
| Mg | <0.1 |
| Al | <0.01 |
| Si | <0.03 |
| P | <0.01 |
| Ti | <0.1 |
| Cr | <0.1 |
| Mn | <0.1 |
| Fe | <0.05 |
| Co | <0.1 |
| Ni | <0.1 |
| Zn | <0.1 |
| Sn | <0.01 |
| Pb | <0.1 |
| Nb | <0.1 |
| Hf | <0.5 |
| sub-total | <0.7 |
| Cu | bal. |

The Cu matrix phase is a phase containing Cu and may be, for example, a phase containing α-Cu. This Cu phase can increase the conductivity and can also further improve the workability. The Cu phase does not contain a eutectic phase. Herein, the eutectic phase refers to a phase containing, for example, Cu and a Cu—Zr compound. The average grain size D50 of the second phase is determined as follows. First, the backscattered electron image of a region of a sample section with a magnification of 100 to 500 times is observed using a scanning electron microscope (SEM). The diameter of the inscribed circle of a grain included in the image is determined. This is regarded as the diameter of the grain. The grain size of all grains present in the field of view is determined. This process is performed in a plurality of fields of view (e.g., 5 fields of view). The cumulative distribution is determined from the obtained grain size, and the median size is defined as an average grain size D50. In this outer portion 22, the Cu—Zr compound phase preferably contains $Cu_5Zr$. The Cu—Zr compound phase may be a single phase or a phase containing two or more Cu—Zr compounds. The Cu—Zr compound phase may be, for example, a $Cu_{51}Zr_{14}$ single phase, a $Cu_9Zr_2$ single phase, a $Cu_5Zr$ single phase, or a $Cu_8Zr_3$ single phase or may be a phase including a $Cu_5Zr$ phase as a main phase and other Cu—Zr compounds ($Cu_{51}Zr_{14}$, $Cu_9Zr_2$, and $Cu_8Zr_3$) as subphases or a phase including a $Cu_9Zr_2$ phase as a main phase and other Cu—Zr compounds ($Cu_{51}Zr_{14}$, $Cu_5Zr$, and $Cu_8Zr_3$) as subphases. The main phase refers to a phase having the highest content (volume ratio or area ratio in the observed region) among the Cu—Zr compound phases. The subphases refer to Cu—Zr compound phases other than the main phase. The Cu—Zr compound phase has, for example, high Young's modulus and high hardness, and therefore the presence of the Cu—Zr compound phase can further increase the mechanical strength of the shank 20. In the Zr phase included in the second phase of the outer portion 22, for example, the Zr content may be 90 at % or more, may be 92 at % or more, or may be 94 at % or more. The second phase may include an oxidized film formed in the outermost shell thereof. The presence of the oxidized film may suppress the diffusion of Cu into the second phase. In the central core of the second phase, many constricted fine grains may form twin crystals. The fine grains are Zr phases and the phase formed in the constriction may be a Cu—Zr compound phase. It is believed that such a structure can further increase, for example, the conductivity and the mechanical strength. The outer portion 22 may also be formed by performing spark plasma sintering on a copper powder with a hypoeutectic composition and a Cu—Zr master alloy or on a copper powder and a $ZrH_2$ powder. The spark plasma sintering will be described later in detail. The hypoeutectic composition may be, for example, a composition having a Zr content of 0.5 at % or more and 8.6 at % or less with the balance being Cu.

The outer portion 22 is preferably conductive. The conductivity of the outer portion 22 is, for example, preferably 20% IACS or more, more preferably 30% IACS or more, and further preferably 40% IACS or more. In this outer portion 22, the hardness of the Cu—Zr compound in the second phase is preferably 300 MHv or more, more preferably 500 MHv or more, and further preferably 600 MHv or more in terms of Vickers hardness. The radius ratio of the outer portion 22 and the inner portion 21 may be 1:1 to 3:1. The inner portion 21 and the outer portion 22 may be bonded to each other through diffusion of Cu during sintering.

The working layer 24 is formed, as a layer for readily working the external shape, on an outer peripheral surface of the outer portion 22. The presence of the working layer 24 can solve a problem in that the external shape cannot be worked because the outer portion 22 is excessively hard. The working layer 24 may be formed of, for example, Cu metal, brass, CuW, $Al_2O_3$—Cu (alumina dispersed copper), a Cu—Cr alloy, or a Cu—Cr—Zr alloy. The working layer 24 may have a thickness of 0.1 mm or more and 5 mm or less. More preferably, the working layer 24 is a layer containing Cu and is formed by simultaneously performing sintering together with the inner portion 21 and the outer portion 22. By reducing the number of times of sintering, the number of processes and the firing energy can be reduced.

Figure 2A:
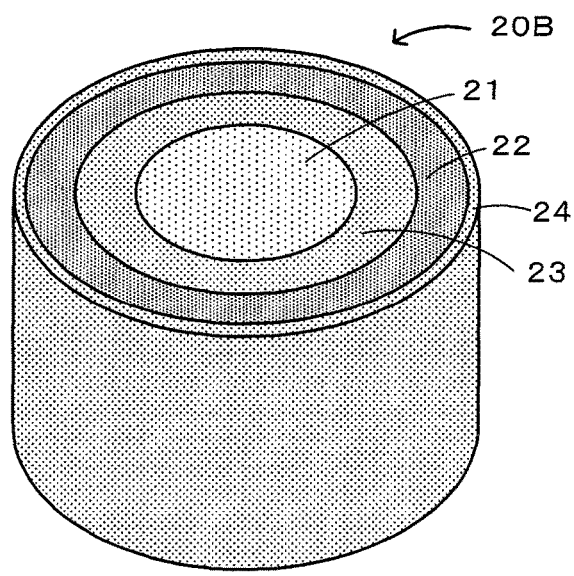
FIGS. 2A to 2D illustrate other shanks 20B to 20E.
Figure 2B:
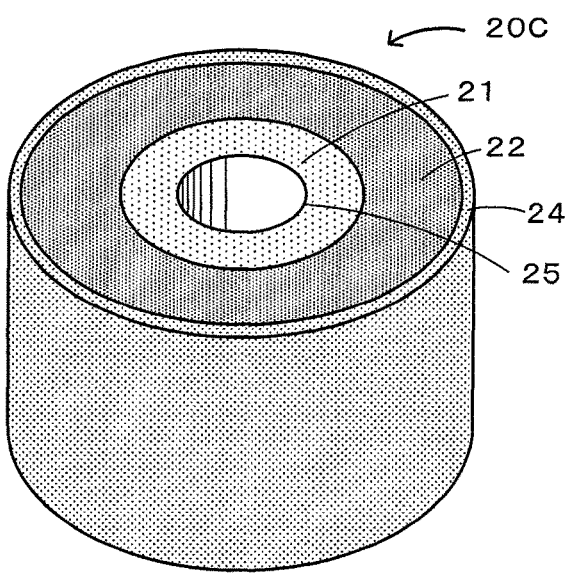
Figure 2C:
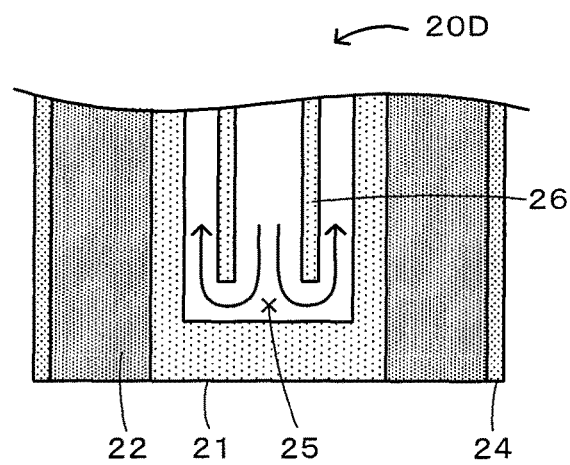
Figure 2D:
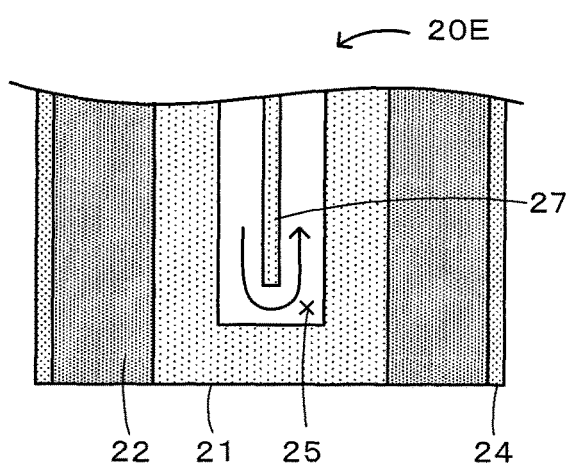

The shape of the shank 20 is not particularly limited, and may be, for example, a cylinder, a cylindroid, or a polygon (e.g., including a rectangle and a hexagon) or may be a linear shape, a bent shape, or a circular arc shape. The shank 20 may have any shape in accordance with the applications. As in the case of a shank 20B in FIG. 2A, by disposing an intermediate portion 23 between the inner portion 21 and the outer portion 22, the intermediate portion 23 having intermediate characteristics therebetween, for example, the conductivity, the mechanical strength, and the hardness may be changed in a direction from the center toward the outer periphery in a multistage manner or a gradient manner. As in the case of a shank 20C in FIG. 2B, the inner portion 21 may have a hollow shape in which an internal space 25 serving as a coolant path such as a water cooling pipe is formed. For example, as in the case of a shank 20D in FIG. 2C, the inner portion 21 may have a double-pipe structure in which an internal space 25 having a cylindrical shape or a polygonal shape (e.g., a rectangular shape) in sectional view is formed inside the inner portion 21 and a circulation pipe 26 is disposed in the internal space 25. As in the case of a shank 20E in FIG. 2D, the inner portion 21 may have a circulation structure in which an internal space 25 having a cylindrical shape or a polygonal shape in sectional view is formed inside the inner portion 21 and a partition plate 27 is disposed in the internal space 25.

Next, a method for producing a conductive supporting member according to this embodiment will be described. This production method is a method for producing a conductive supporting member including an outer portion and an inner portion that is present on the inner side of the outer portion and has higher conductivity than the outer portion. This production method may include (a) a powdering step of preparing a mixed powder of raw materials and (b) a sintering step of performing spark plasma sintering (SPS) using the raw material powder. A powder may be separately provided to omit the powdering step.

(a) Powdering Step

In this step, a copper powder and a Cu—Zr master alloy or a copper powder and a $ZrH_2$ powder are weighed so as to have an alloy composition represented by Cu-xZr (x is atomic % (hereafter referred to as at %) of Zr and $0.5 \leq x \leq 8.6$ is satisfied) and ground and mixed in an inert atmosphere until the average particle size D50 reaches 1 μm or more and 500 μm or less to prepare a mixed powder. In this step, raw materials (a copper powder and a Cu—Zr master alloy or a copper powder and a $ZrH_2$ powder) may be weighed so as to have an alloy composition represented by Cu-xZr (0.5 at %$\leq x \leq$16.7 at %). The mixed powder may be prepared so as to have any one of a hypoeutectic composition (0.5 at %$\leq x \leq$8.6 at %), a eutectic composition (x=8.6 at %), and a hypereutectic composition (8.6 at %$< x \leq$16.7 at %). The average particle size of the copper powder is, for example, preferably 180 μm or less, more preferably 75 μm or less, and further preferably 5 μm or less. The average particle size is a D50 particle size measured with a laser diffraction particle size distribution analyzer. The copper powder is preferably constituted by copper and an unavoidable component and more preferably constituted by oxygen-free copper (JIS C1020). Examples of the unavoidable component include Be, Mg, Al, Si, P, Ti, Cr, Mn, Fe, Co, Ni, Zn, Sn, Pb, Nb, and Hf. The content of the unavoidable component may be in the range of 0.01 mass % or less relative to the total amount. In this step, the raw material for Zr is preferably a Cu—Zr master alloy having a Cu content of 50 mass %. This Cu—Zr alloy is preferably used because of its relatively high chemical stability and ease of handling. The Cu—Zr master alloy may be an ingot or pieces of metal, but is preferably fine metal particles because grinding and mixing are easily performed. The average particle size of the Cu—Zr alloy is, for example, preferably 250 μm or less and more preferably 20 μm or less. In this step, the raw material for Zr is preferably a eutectic $ZrH_2$ powder. The $ZrH_2$ powder is preferably used because of its relatively high chemical stability and ease of handling in the air. The average particle size of the $ZrH_2$ powder is, for example, preferably 10 μm or less and more preferably 5 μm or less.

In this step, the raw materials are mixed so as to have an alloy composition represented by Cu-xZr (0.5 at %$\leq x \leq$16.7 at %), but x may satisfy, for example, any one of 8.6 at %$\leq x \leq$16.7 at %, 8.6 at %$\leq x \leq$15.2 at %, 15.2 at %$\leq x \leq$16.7 at %, and 5.0 at %$\leq x \leq$8.6 at %. At a high Zr content, the mechanical strength tends to increase. In the alloy composition, 0.5 at %$\leq x \leq$5.0 at % may be satisfied. At a high Cu content, the conductivity tends to increase. That is, in this step, the raw materials are mixed so as to have an alloy composition represented by $Cu_{1-x}Zr_x$ ($0.005 \leq X \leq 0.167$), but X may satisfy, for example, $0.05 \leq X \leq 0.086$ or $0.086 \leq X \leq 0.167$. At a high Zr content, the mechanical strength tends to increase. In the alloy composition, $0.005 \leq X \leq 0.05$ may be satisfied. At a high Cu content, the conductivity tends to increase. In this step, the copper powder, the Cu—Zr master alloy or the $ZrH_2$ powder, and a grinding medium may be ground and mixed in a hermetically sealed container. In this step, grinding and mixing are preferably performed using, for example, a ball mill. Non-limiting examples of the grinding medium include agate ($SiO_2$), alumina ($Al_2O_3$), silicon nitride (SiC), zirconia ($ZrO_2$), stainless steel (Fe—Cr—Ni), chrome steel (Fe—Cr), and cemented carbide (WC—Co). From the viewpoint of high hardness, specific gravity, and prevention of contamination with a foreign substance, Zr balls are preferably used. In the hermetically sealed container, an inert atmosphere of nitrogen, He, Ar, or the like is employed. The treatment time of the grinding and mixing may be empirically set so that the average particle size D50 is 1 μm or more and 500 μm or less. The treatment time may be, for example, 12 hours or more or 24 hours or more. The average particle size D50 of the mixed powder is preferably 100 μm or less, more preferably 50 μm or less, and further preferably 20 μm or less. The mixed powder subjected to the grinding and mixing preferably has a small particle size because a homogeneous copper alloy is obtained. For example, the mixed powder prepared by the grinding and mixing may contain a Cu powder and a Zr powder or may contain a Cu—Zr alloy powder. For example, at least part of the mixed powder prepared by the grinding and mixing may be alloyed through the grinding and mixing.

(b) Sintering Step

In this step, a raw material for the inner portion is arranged and a mixed powder raw material for the outer portion is arranged on the outer side of the raw material for the inner portion. They are held at a particular temperature lower than the eutectic point while a particular pressure is applied, and the mixed powder is subjected to spark plasma sintering. Herein, a raw material for the working layer may be arranged on the outer side of the outer portion, and sintering may be performed together with the raw material for the working layer in this step. As in the case of the shank 20B in FIG. 2A, a raw material for the intermediate portion having intermediate characteristics between the inner portion and the outer portion may be arranged between the inner portion and the outer portion, and sintering may be performed. In this step, an internal space through which a coolant is caused to circulate may be formed in the inner portion by arranging a space-forming raw material that can be removed later and removing the space-forming raw material after sintering (refer to FIGS. 2B to 2D). In this step (b), the raw material may be inserted into a graphite die and subjected to spark plasma sintering in a vacuum. The raw material for the inner portion may be in the form of a powder, a formed body, or a sintered body, but is preferably in the form of a powder. This is because sintering can be performed together with the powder for the outer portion. The raw material for the inner portion may be a powder of, for example, Cu metal, CuW, $Al_2O_3$—Cu (alumina dispersed copper), a Cu—Cr alloy, or a Cu—Cr—Zr alloy. When the raw materials for the inner portion and the outer portion are used in the form of a powder, for example, a space inside a partition having a shape of the inner portion is filled with a powder for the inner portion, a space on the outer side of the partition is filled with a raw material powder for the outer portion, and the partition may be removed before SPS treatment. The raw material for the outer portion is a powder that is prepared in the powdering step and has an alloy composition represented by Cu-xZr (0.5 at %≤x≤16.7 at %).

The vacuum conditions during sintering may be, for example, 200 Pa or less, 100 Pa or less, or 1 Pa or less. In this step, spark plasma sintering may be performed at a temperature (e.g., 600° C. to 950° C.) lower than the eutectic point by 400° C. to 5° C. or at a temperature lower than the eutectic point by 272° C. to 12° C. The spark plasma sintering may be performed at a temperature of 0.9Tm ° C. or less (Tm (° C.) refers to a melting point of alloy powder). The pressure applied to the raw material may be 10 MPa or more and 100 MPa or less or may be 60 MPa or less. Thus, a dense copper alloy can be obtained. The holding time under pressure is preferably 5 minutes or longer, more preferably 10 minutes or longer, and further preferably 15 minutes or longer. The holding time under pressure is also preferably 100 minutes or shorter. Regarding the spark plasma conditions, for example, a direct current of 500 A or more and 2000 A or less is preferably caused to flow between a die and a base plate.

According to the conductive supporting member (shank 20) of this embodiment and the method for producing the conductive supporting member that have been described in detail, a conductive supporting member having high conductivity and higher hardness can be provided. The reason for this is assumed to be as follows. For example, the conductive supporting member includes an inner portion formed of a highly conductive metal containing Cu and an outer portion formed of a material containing a Cu matrix phase having high strength and a second phase containing a Cu—Zr compound, and therefore it is assumed that high conductivity is achieved on the inner side and high strength and high hardness are achieved on the outer side. In such a method for producing a conductive supporting member, generally, some metal powders have a high reactivity depending on their elements. For example, a Zr powder has a high reactivity with oxygen. When the Zr powder is used as a raw material powder in the air, the handling requires extreme caution. In contrast, a Cu—Zr master alloy powder (e.g., Cu-50 mass % Zr master alloy) and a ZrH$_2$ powder are relatively stable and easily handled even in the air. Through a relatively simple treatment in which such raw material powders are subjected to spark plasma sintering, an outer portion containing a Cu—Zr compound can be produced. Furthermore, since the outer portion, the inner portion, and the working layer are formed of Cu materials, there is no large difference in sintering temperature. Therefore, the target product can be obtained through a single spark plasma sintering (SPS) process. Moreover, through a relatively simple treatment in which a Cu—Zr master alloy powder (e.g., Cu-50 mass % Zr master alloy) or a ZrH$_2$ powder having relatively high chemical stability is subjected to spark plasma sintering, a conductive supporting member can be produced.

The conductive supporting member according to the present disclosure and the method for producing the conductive supporting member are not limited to the above embodiments. It is obvious that various embodiments can be made without departing from the technical scope of the present disclosure.

EXAMPLES

Hereafter, Examples in which conductive supporting members were specifically produced will be described. First, Experimental Examples in which the characteristics of a Cu—Zr material for the outer portion were investigated will be described. Experimental Examples 3-1 to 3-3 and 4-1 to 4-3 correspond to Examples, and Experimental Examples 1-1 to 1-3 and 2-1 to 2-3 correspond to Reference Examples.

Experimental Example 1 (1-1 to 1-3)

Cu—Zr alloy powders prepared by using a high-pressure Ar gas atomizing method as a powdering method were used. These alloy powders had average particle sizes D50 of 20 to 28 μm. The Zr contents of the Cu—Zr alloy powders were 1 at %, 3 at %, and 5 at %, which respectively correspond to alloy powders in Experimental Examples 1-1 to 1-3. The particle size of each alloy powder was measured using a laser diffraction particle size distribution analyzer (SALD-3000J) manufactured by SHIMADZU Corporation. The oxygen content of each powder was 0.100 mass %. SPS (spark plasma sintering) was performed as a sintering step using a spark plasma sintering apparatus (Model: SPS-210LX) manufactured by SPS SYNTEX Inc. Into a graphite die having a cavity with a diameter of 20 mm×10 mm, 40 g of the powder was inserted. A pulsed direct current of 3 kA to 4 kA was applied, and copper alloys (SPS materials) in Experimental Examples 1-1 to 1-3 were produced at a heating rate of 0.4 K/s at a sintering temperature of 1173 K (about 0.9Tm; Tm refers to a melting point of alloy) for a holding time of 15 minutes at a pressure of 30 MPa. The copper alloys produced by this method are collectively referred to as "Experimental Example 1".

Experimental Example 2 (2-1 to 2-3)

A commercially available Cu powder (average particle size D50=33 μm) and a commercially available Zr powder (average particle size D50=8 μm) were mixed with each other so that the resulting Cu—Zr alloy powders had Zr contents of 1 at %, 3 at %, and 5 at %, which respectively correspond to alloy powders in Experimental Examples 2-1 to 2-3. CIP forming was performed at 20° C. at 200 MPa and then the same processes as those in Experimental Example 1 were performed. The resulting copper alloys are referred to as Experimental Example 2 (2-1 to 2-3). In Experimental Example 2, all the processes were performed in an Ar atmosphere.

Experimental Example 3 (3-1 to 3-3)

Figure 3A:
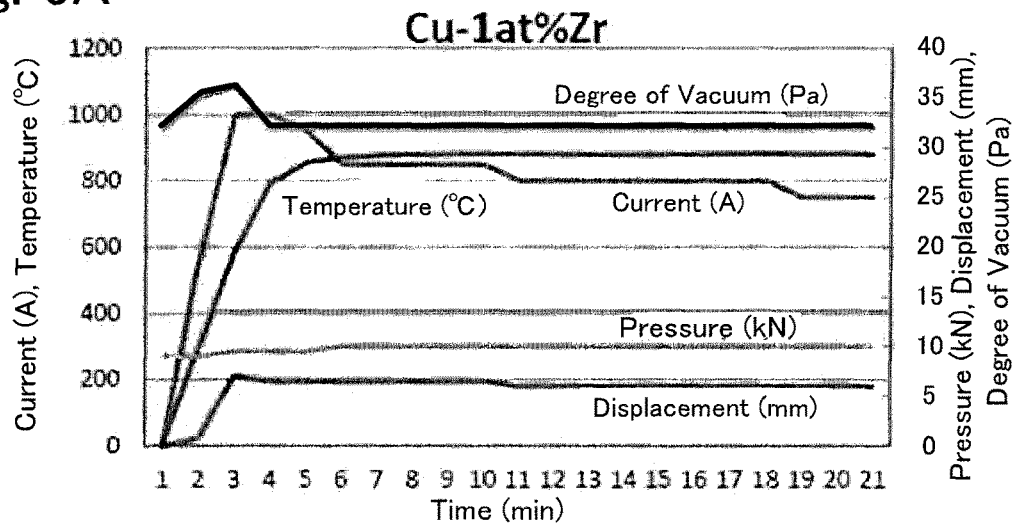
FIGS. 3A to 3C illustrate SPS conditions in Experimental Example 3.
Figure 3B:
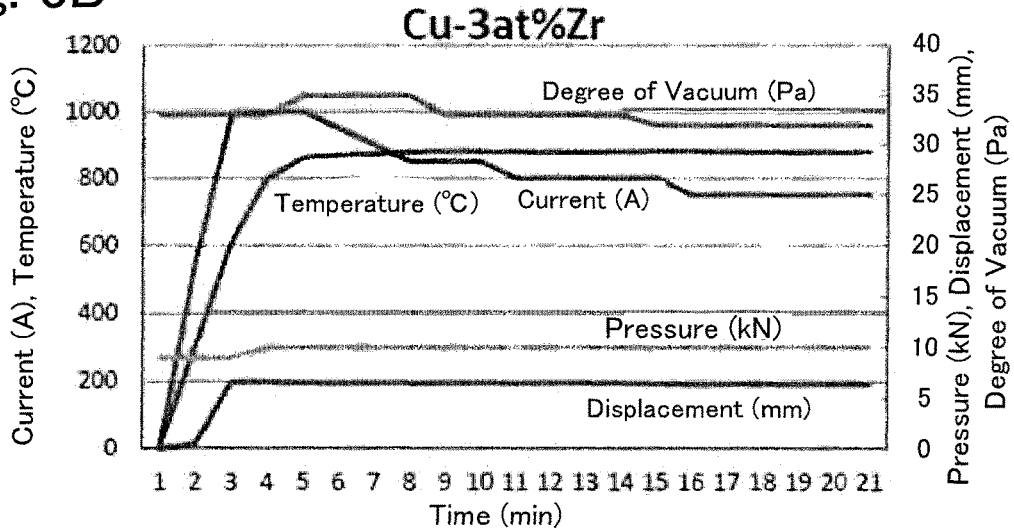
Figure 3C:
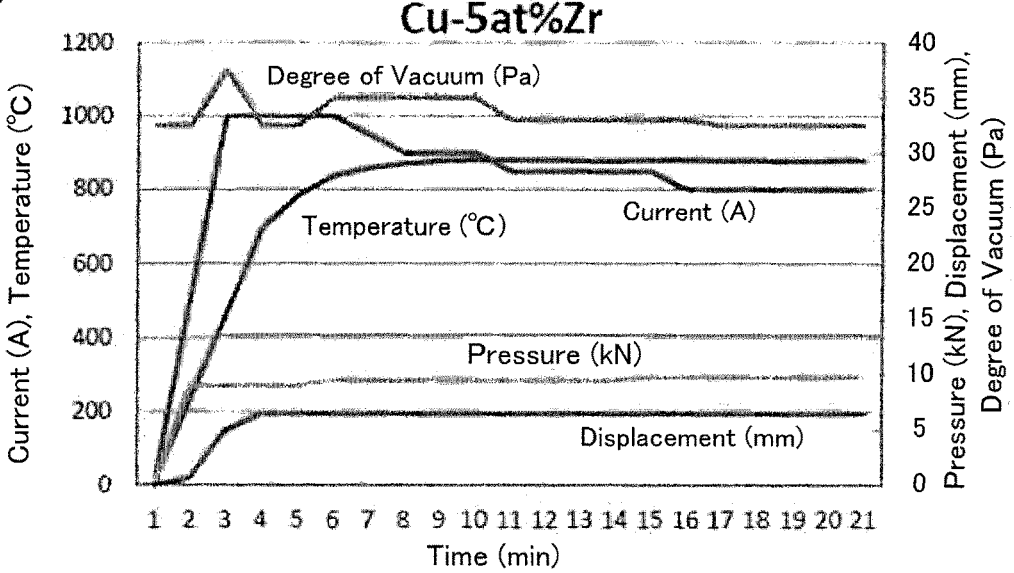

A commercially available Cu powder (average particle size D50=1 μm) and a commercially available Cu-50 mass % Zr alloy were ground and mixed for 24 hours in a ball mill using Zr balls. The resulting powders had an average particle size D50 of 18.7 μm. Mixing was performed so that the Cu—Zr alloy powders had Zr contents of 1 at %, 3 at %, and 5 at %, which respectively correspond to alloy powders in Experimental Examples 3-1 to 3-3. The copper alloys obtained through the same processes as those in Experimental Example 1 using the powders are referred to as Experimental Example 3 (3-1 to 3-3). FIGS. 3A to 3C illustrate SPS conditions in Experimental Example 3.

Experimental Example 4 (4-1 to 4-3)

A commercially available Cu powder (average particle size D50=1 μm) and a commercially available ZrH$_2$ powder (average particle size D50=5 μm) were ground and mixed for 4 hours in a ball mill using Zr balls. The resulting powders were mixed so that the Cu—Zr alloy powders had Zr contents of 1 at %, 3 at %, and 5 at %, which respectively correspond to alloy powders in Experimental Examples 4-1 to 4-3. The copper alloys obtained through the same processes as those in Experimental Example 1 using the powders are referred to as Experimental Example 4 (4-1 to 4-3).

(Observation of Microstructure)

The microstructure was observed by using a scanning electron microscope (SEM), a scanning transmission electron microscope (STEM), and a nano-beam electron diffraction method (NBD). The SEM observation was performed with S-5500 manufactured by Hitachi High-Technologies Corporation at an acceleration voltage of 2.0 kV to take a secondary electron image and a backscattered electron image. The TEM observation was performed with JEM-2100F manufactured by JEOL Ltd. at an acceleration voltage of 200 kV to take a BF-STEM image and a HAADF-STEM image, and nano-beam electron diffraction was performed. Furthermore, ultimate analysis was performed with EDX (JED-2300T manufactured by JEOL Ltd.) as needed. The measurement sample was prepared with a SM-09010 cross-section polisher (CP) manufactured by JEOL Ltd. by performing ion milling at an acceleration voltage of 5.5 kV using argon as an ion source.

(XRD Measurement)

The compound phase was identified by an X-ray diffraction method using Co-Kα rays. The XRD measurement was performed with RINT RAPID II manufactured by Rigaku Corporation.

(Evaluation of Electrical Characteristics)

The electrical characteristics of the obtained SPS materials and wire-drawn materials in Experimental Examples were determined by performing probe conductivity measurement at ordinary temperature and measuring electrical resistance by a four-terminal method at a length of 500 mm. The conductivity was determined by measuring the volume resistivity of the copper alloy in conformity with JIS-H0505, calculating the ratio of the volume resistivity to the resistivity (0.017241 μΩm) of annealed pure copper, and performing conversion to conductivity (% IACS). The conversion was performed using the following formula:

Conductivity γ (% IACS)=0.017241/volume resistivity ρ×100.

(Evaluation of Characteristics of Cu—Zr Compound Phase)

The Young's modulus E of a Cu—Zr compound phase included in the copper alloy in Experimental Example 3 was measured and the hardness H of the Cu—Zr compound phase was measured by a nanoindentation method. The measurement was performed with a Nano Indenter XP/DCM manufactured by Agilent Technologies using XP as an indenter head and a Berkovich diamond indenter. The analysis software was Test Works 4 manufactured by Agilent Technologies. The measurement conditions were as follows: measurement mode CSM (continuous stiffness measurement), excited oscillation frequency 45 Hz, excited oscillation amplitude 2 nm, strain rate 0.05 s$^{-1}$, indentation depth 1000 nm, number N of measurement points 5, distance between measurement points 5 μm, measurement temperature 23° C., and standard sample fused silica. The sample was subjected to cross-section processing with a cross-section polisher (CP). A sample stage and the sample were heated at 100° C. for 30 seconds to fix the sample to the sample stage using a hot-melt adhesive. They were inserted into a measurement apparatus. The Young's modulus E of the Cu—Zr compound phase was measured and the hardness H of the Cu—Zr compound phase was measured by a nanoindentation method. Herein, the average of values measured at 5 points was defined as Young's modulus E or hardness H by a nanoindentation method.

(Consideration of Material for Outer Portion)

Figure 4A:
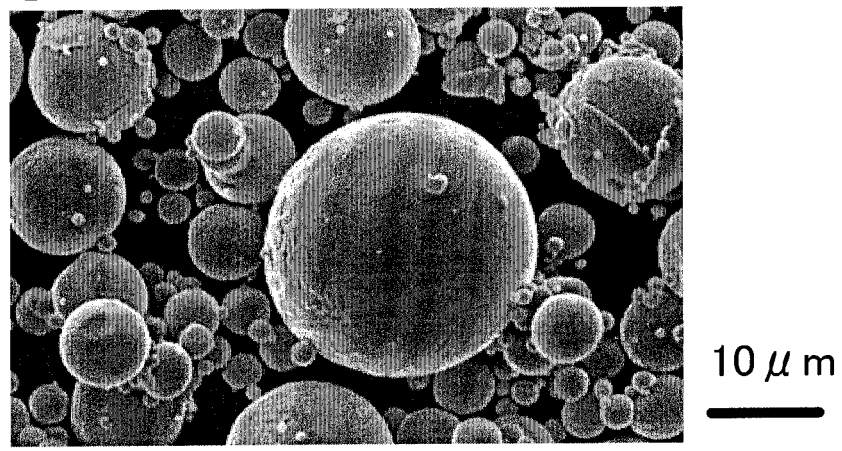
FIGS. 4A to 4C illustrate SEM images of raw material powders in Experimental Examples 1-3, 3-3, and 4-3.
Figure 4B:
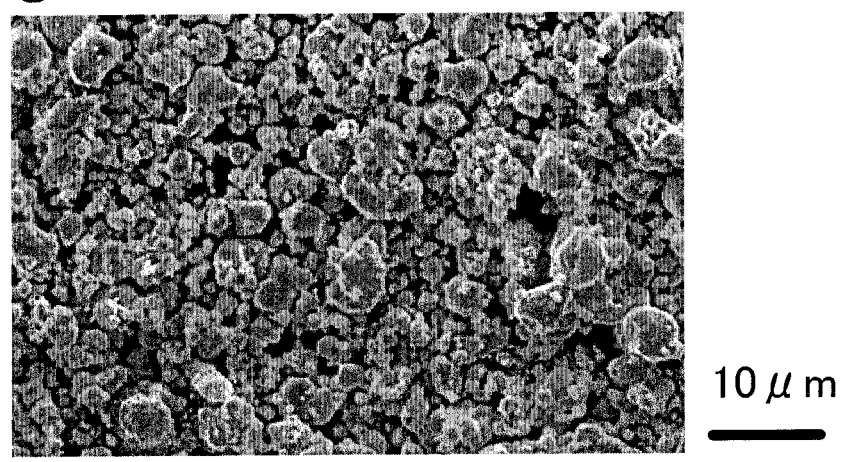
Figure 4C:
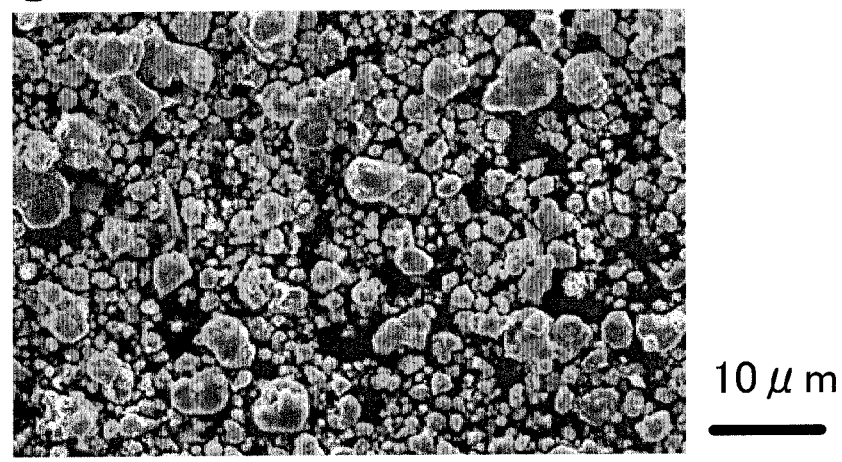
Figure 5:
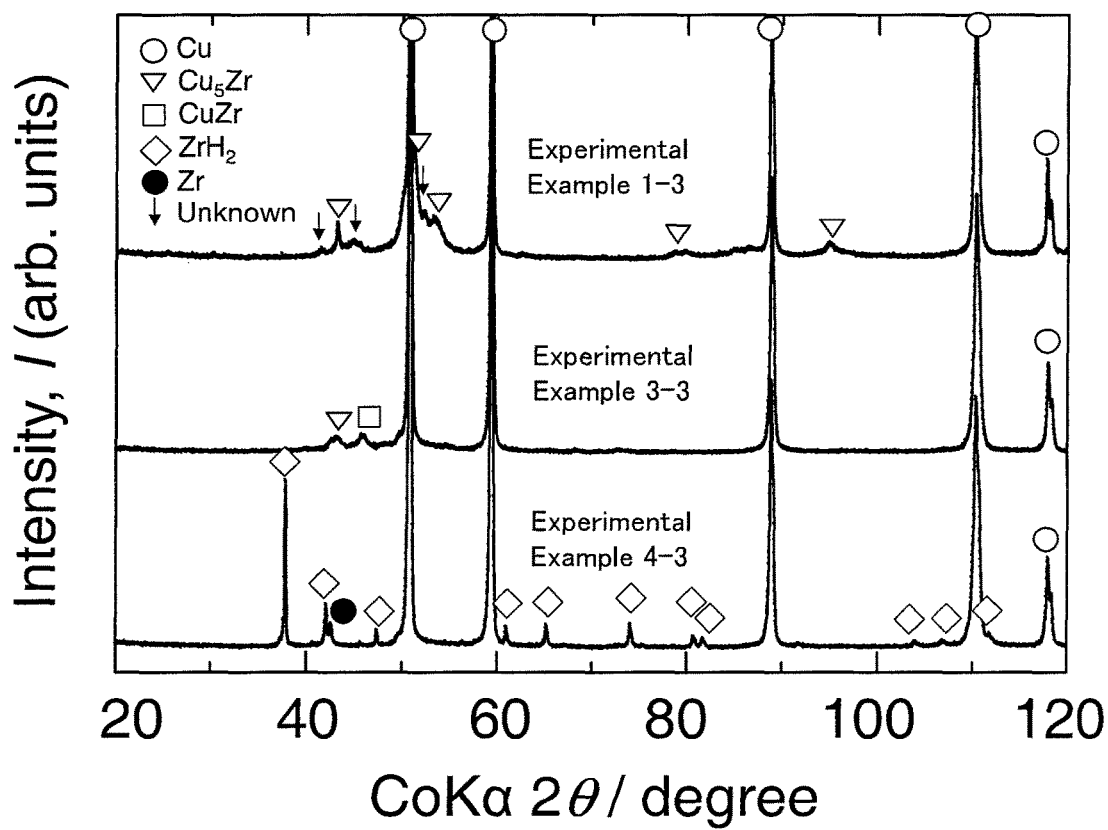
FIG. 5 illustrates measurement results of X-ray diffraction of raw material powders in Experimental Examples 1-3, 3-3, and 4-3.

First, the raw material was investigated. FIG. 4A illustrates a SEM image of the raw material powder in Experimental Example 1-3, FIG. 4B illustrates a SEM image of the raw material powder in Experimental Example 3-3, and FIG. 4C illustrates a SEM image of the raw material powder in Experimental Example 4-3. The raw material powder in Experimental Example 1-3 had a spherical shape. In the raw material powders in Experimental Examples 3-3 and 4-3, a coarse teardrop-shaped Cu powder and a fine spherical CuZr powder or ZrH$_2$ powder were present in a mixed manner. FIG. 5 illustrates the measurement results of X-ray diffraction of the raw material powders in Experimental Examples 1-3, 3-3, and 4-3. In the raw material powder in Experimental Example 1-3, a Cu phase, a Cu$_5$Zr compound phase, and an unknown phase were observed. In the raw material powder in Experimental Example 3-3, a Cu phase, a CuZr compound phase, and a Cu$_5$Zr compound phase were observed. The raw material powder in Experimental Example 4-3 had a multiphase structure including a Cu phase, a ZrH$_2$ phase, and an α-Zr phase. SPS materials investigated below were produced using these powders.

Figure 6:
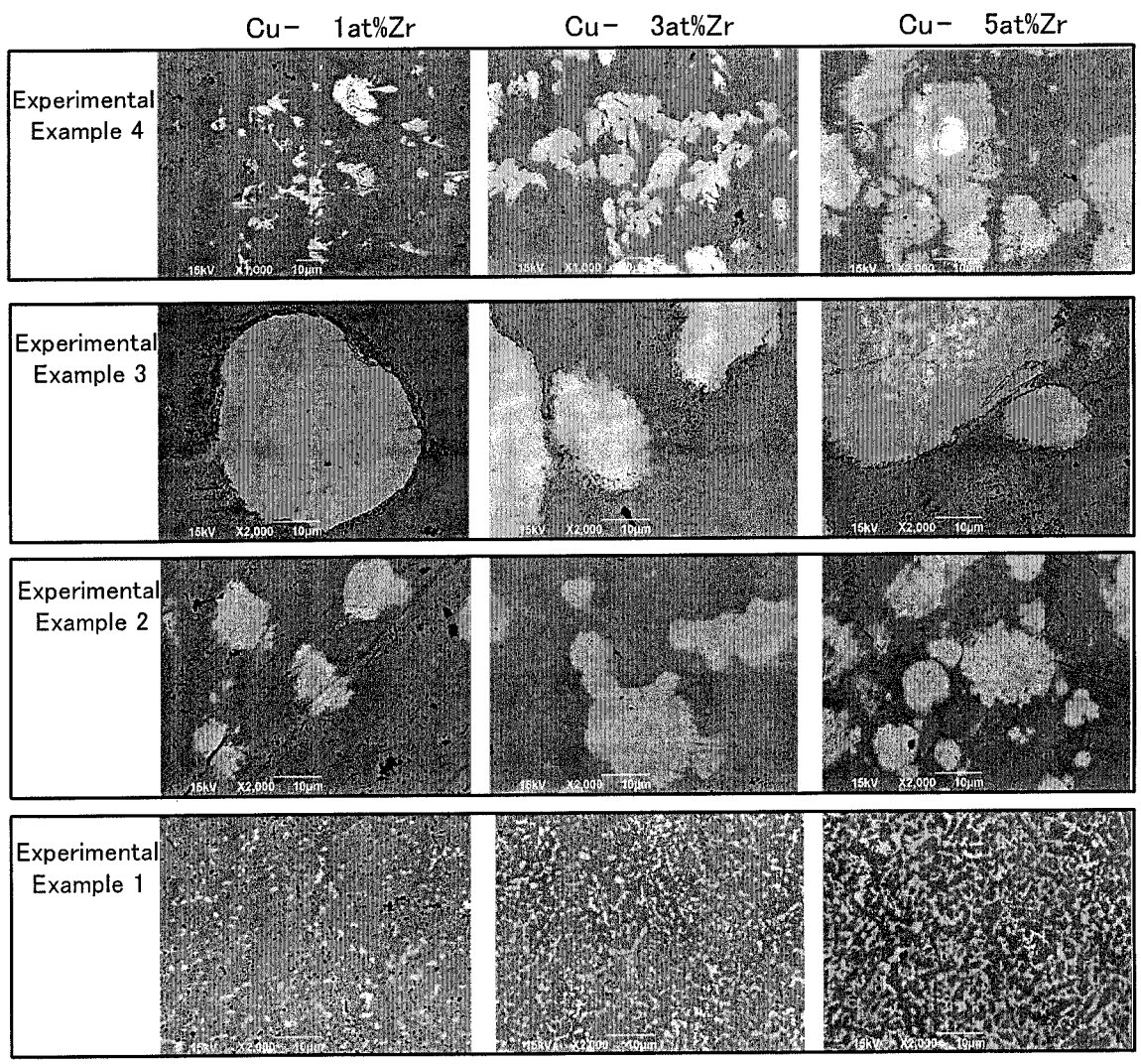
FIG. 6 illustrates SEM-BEI images of sections in Experimental Examples 1 to 4.
Figure 7:
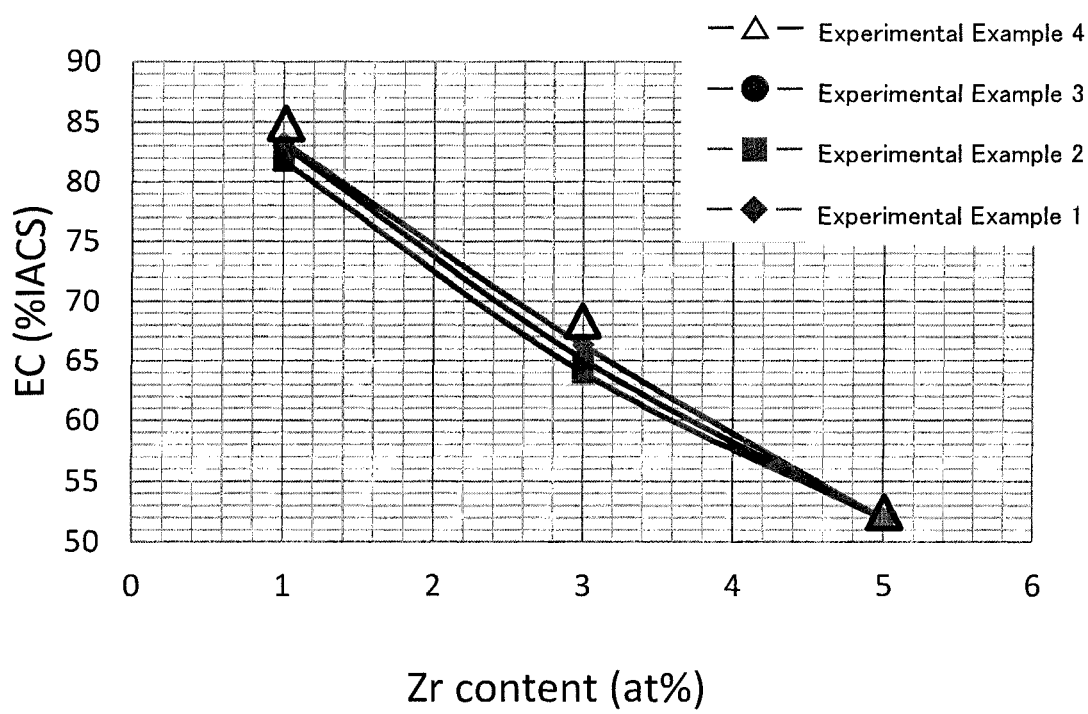
FIG. 7 illustrates measurement results of conductivity of copper alloys in Experimental Examples 1 to 4.
Figure 8:
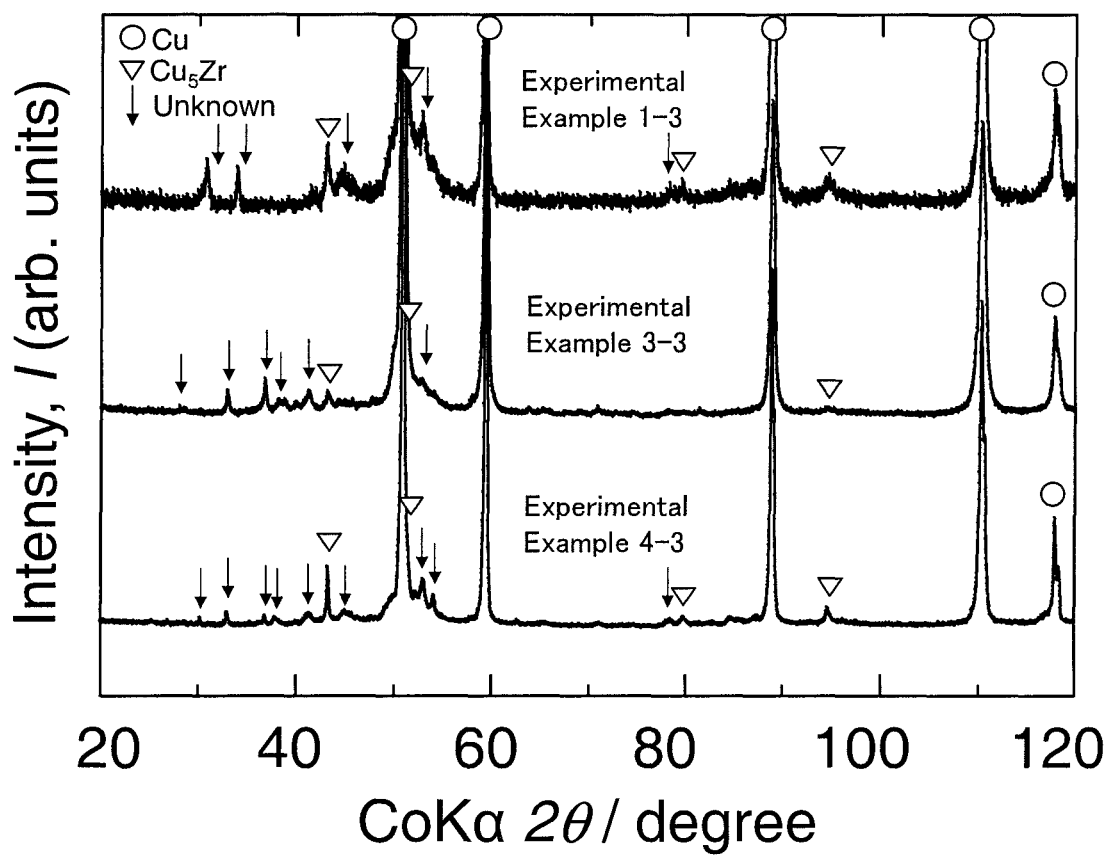
FIG. 8 illustrates measurement results of X-ray diffraction in Experimental Examples 1-3, 3-3, and 4-3.

FIG. 6 illustrates SEM-BEI images of sections in Experimental Examples 1 to 4. The copper alloys in Experimental Example 1 each had a structure which included a Cu phase and a Cu—Zr compound (mainly Cu$_5$Zr) phase without including a eutectic phase and in which crystals having a size of 10 μm or less were dispersed in sectional view. In Experimental Example 1, a relatively uniform structure containing a Cu—Zr compound having a small grain size in sectional view was provided. In contrast, the copper alloys in Experimental Examples 2 to 4 each had a structure in which a relatively large second phase was dispersed in an α-Cu matrix phase. FIG. 7 illustrates the measurement results of the conductivity of the copper alloys in Experimental Examples 1 to 4. The copper alloys in Experimental Examples 1 to 4 had the above-described structural difference, but there was no large difference in the tendency of Zr content and conductivity among the copper alloys in Experimental Examples 1 to 4. This is believed to be because the conductivity of the copper alloy is dependent on the Cu phase and the Cu phase had no structural difference. It is also believed that the mechanical strength of the copper alloy is dependent on the Cu—Zr compound phase, and thus the mechanical strength is relatively high in Experimental Examples 2 to 4 because of the presence of the Cu—Zr compound phase. FIG. 8 illustrates the measurement results of X-ray diffraction in Experimental Examples 1-3, 3-3, and 4-3. As illustrated in FIG. 8, in Experimental Examples 1, 3, and 4, an α-Cu phase, a Cu$_5$Zr compound phase, and an unknown phase were detected and thus the copper alloys were assumed to each have a composite structure including the above phases. This shows that even if the starting raw material powders are different, the resulting SPS materials have the same structure. Although the SPS materials in Experimental Examples 1-1, 1-2, 3-1, 3-2, 4-1, and 4-2 had different X-ray diffraction intensities in accordance with the Zr content, they had the same multiphase structure as the SPS materials illustrated in FIG. 8.

Figure 9:
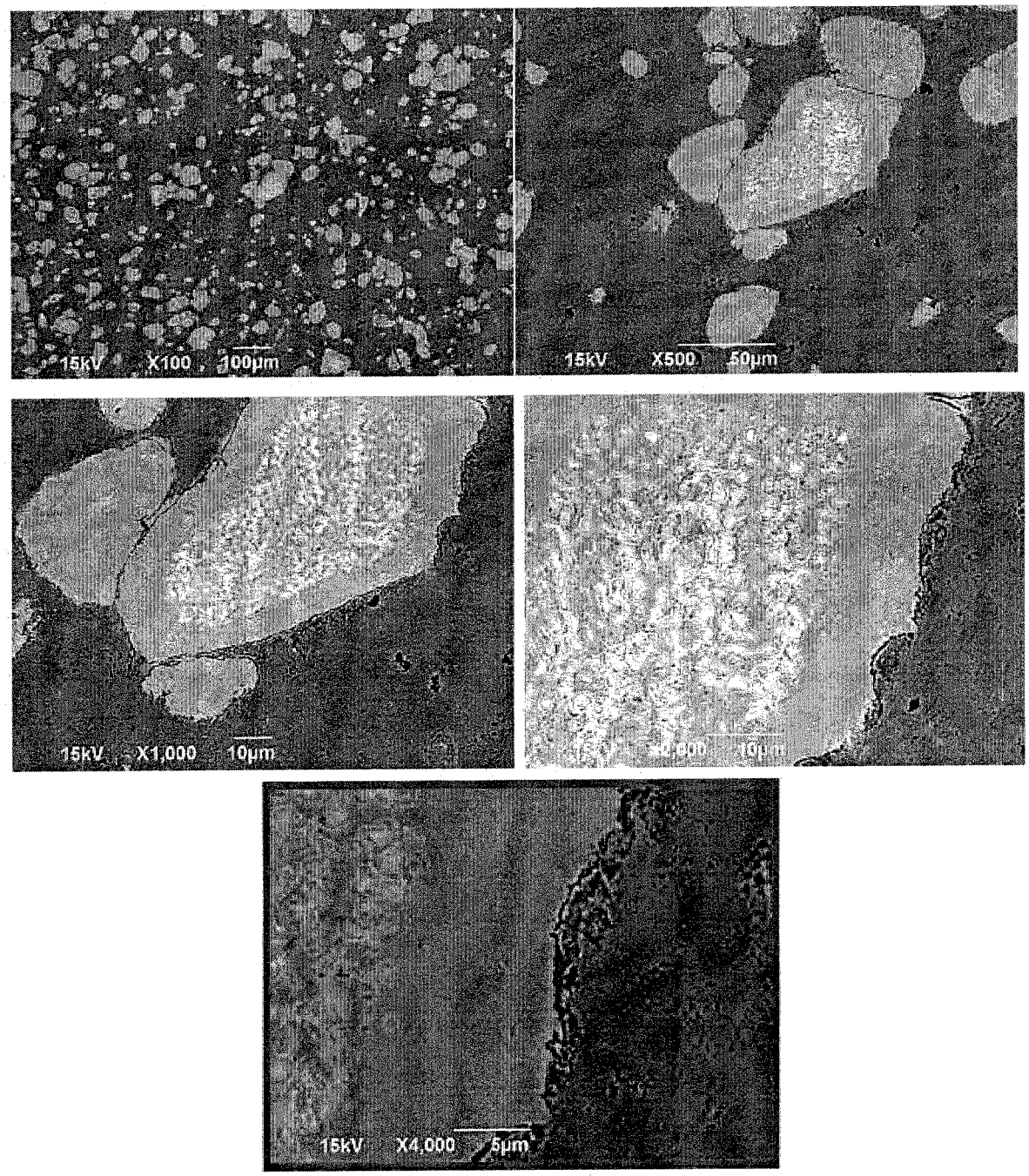
FIG. 9 illustrates SEM-BEI images of a section in Experimental Example 3-3.

Next, Experimental Example 3 was investigated in detail. FIG. 9 illustrates SEM-BEI images of a section in Experimental Example 3-3. The average grain size D50 of the second phase was determined from the taken SEM images.

Figure 10:
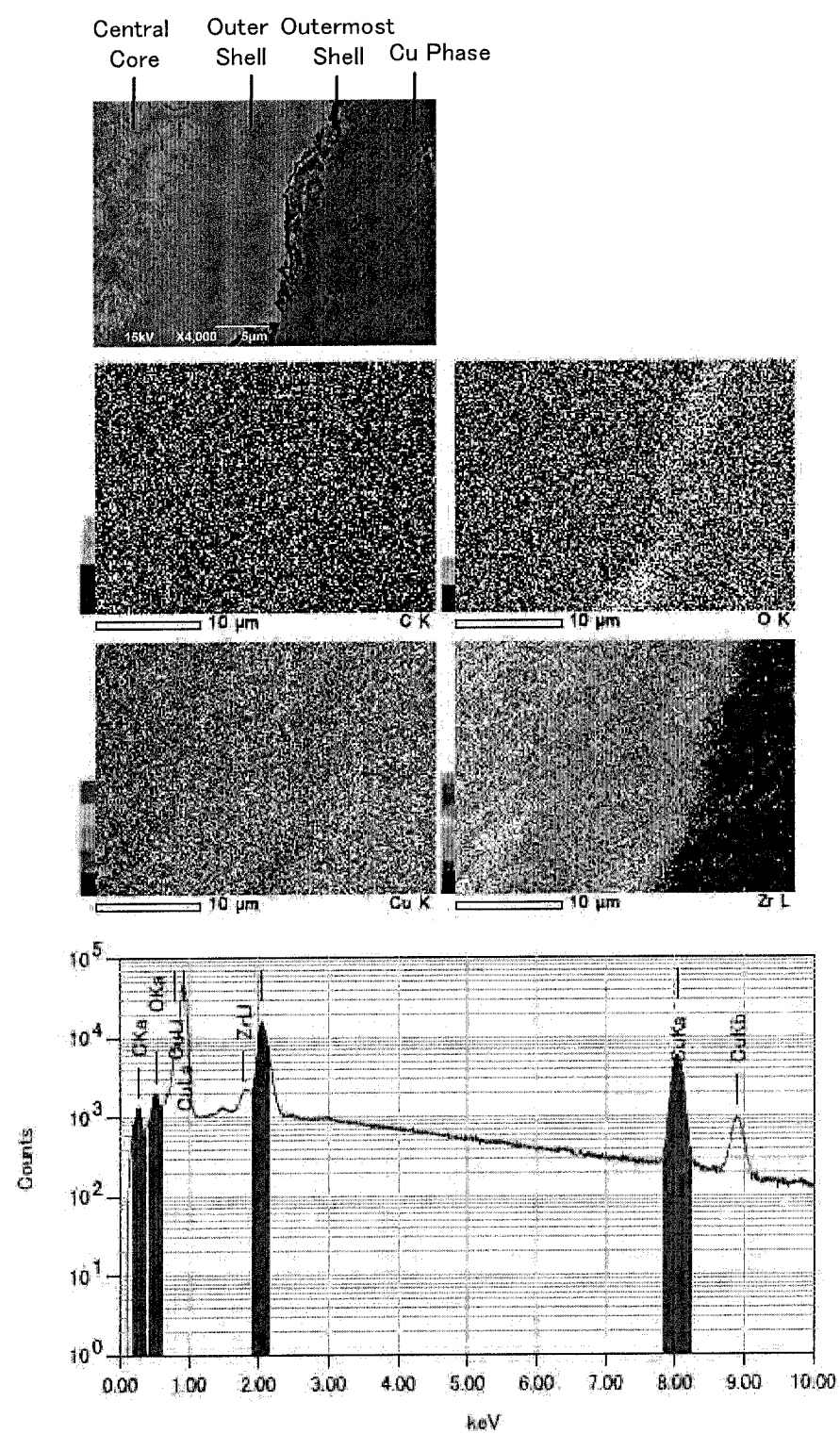
FIG. 10 illustrates SEM-BEI images and EDX measurement results of a section in Experimental Example 3-3.
Figure 11:
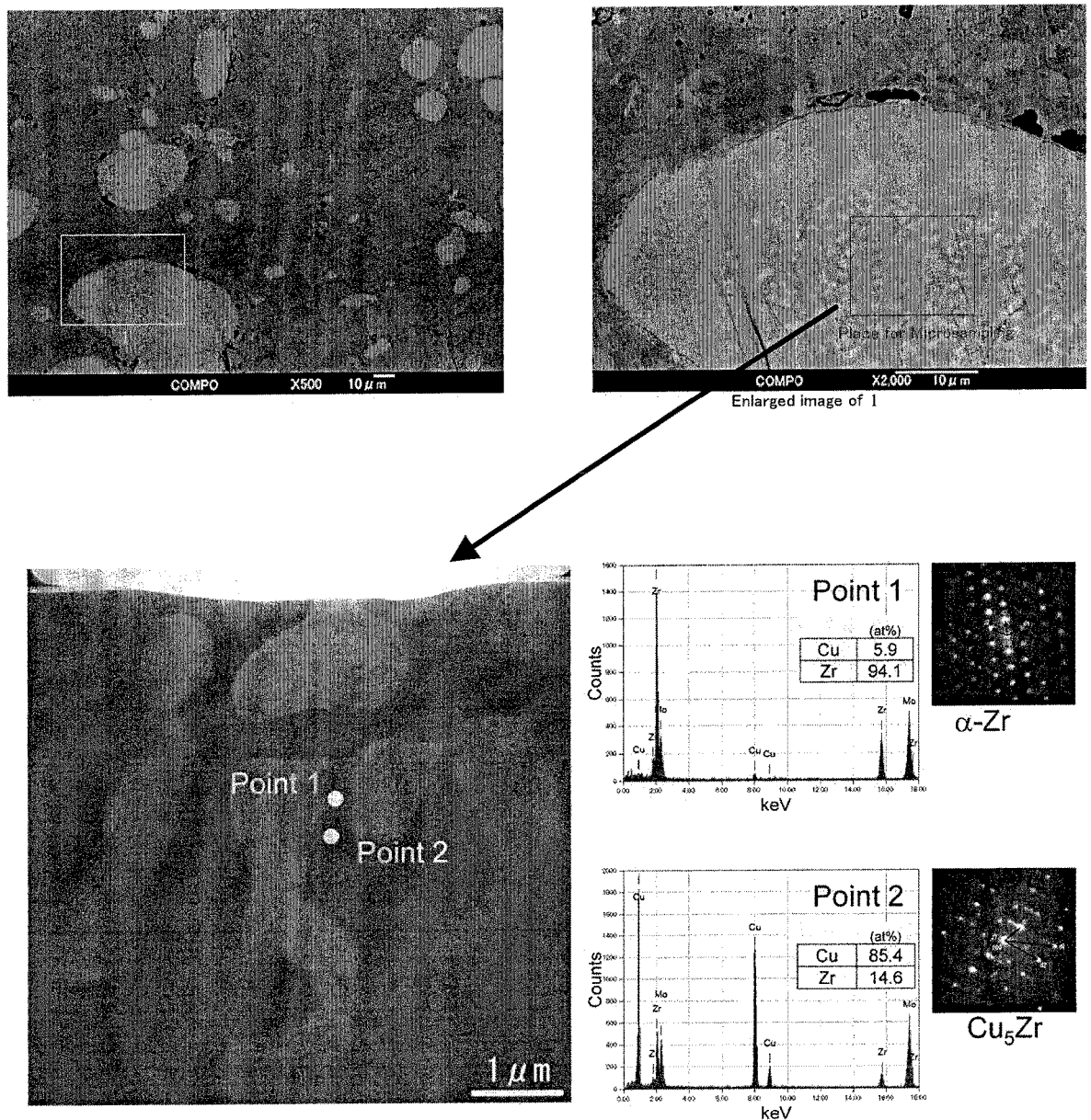
FIG. 11 illustrates SEM-BEI images, STEM-BF images, EDX analysis results, and NBD patterns of a section in Experimental Example 3-3.

The average grain size of the second phase was determined as follows. The backscattered electron image of a region with a magnification of 100 to 500 times was observed. The diameter of the inscribed circle of a grain included in the image was determined. This was regarded as the diameter of the grain. The grain size of all grains present in the field of view was determined. This process was performed in five fields of view. The cumulative distribution was determined from the obtained grain size, and the median size was defined as an average grain size D50. As illustrated in SEM images in FIG. 10, in the copper alloy in Experimental Example 3, the average grain size D50 of the second phase in sectional view was found to be in the range of 1 µm to 100 µm. The second phase was also assumed to include an oxidized film formed in the outermost shell of a coarse grain. In the central core of the second phase, many constricted fine grains were found to form twin crystals. FIG. 10 illustrates SEM-BEI images of a section in Experimental Example 3-3 and the EDX measurement results. FIG. 11 illustrates SEM-BEI images, STEM-BF images, EDX analysis results, and NBD patterns of a section in Experimental Example 3-3. It was found from the ultimate analysis results that the second phase had an outer shell including a Cu—Zr compound phase containing $Cu_5Zr$ and a central core including a Zr-rich Zr phase having a Cu content of 10 at % or less.

The hardness H of the Zr phase and the Cu—Zr compound phase was measured by a nanoindentation method. For Young's modulus E and hardness H, the multi-point measurement was performed and then measurement points indented into the Zr phase were extracted through SEM observation. The Young's modulus E and the hardness H by a nanoindentation method were determined from the measurement results. For the Zr phase, the Young's modulus was 75.4 GPa on average and the hardness H was 3.37 GPa (in terms of Vickers hardness, MHv=311) on average. For the Cu—Zr compound phase, the Young's modulus E was 159.5 GPa and the hardness H was 6.3 GPa (in terms of Vickers hardness, MHv=585), which were different from those of the Zr phase. In this conversion, MHv=0.0924×H was used (ISO 14577-1 Metallic Materials—Instrumented Indentation Test for Hardness and Materials Parameters—Part 1: Test Method, 2002).

Figure 12:
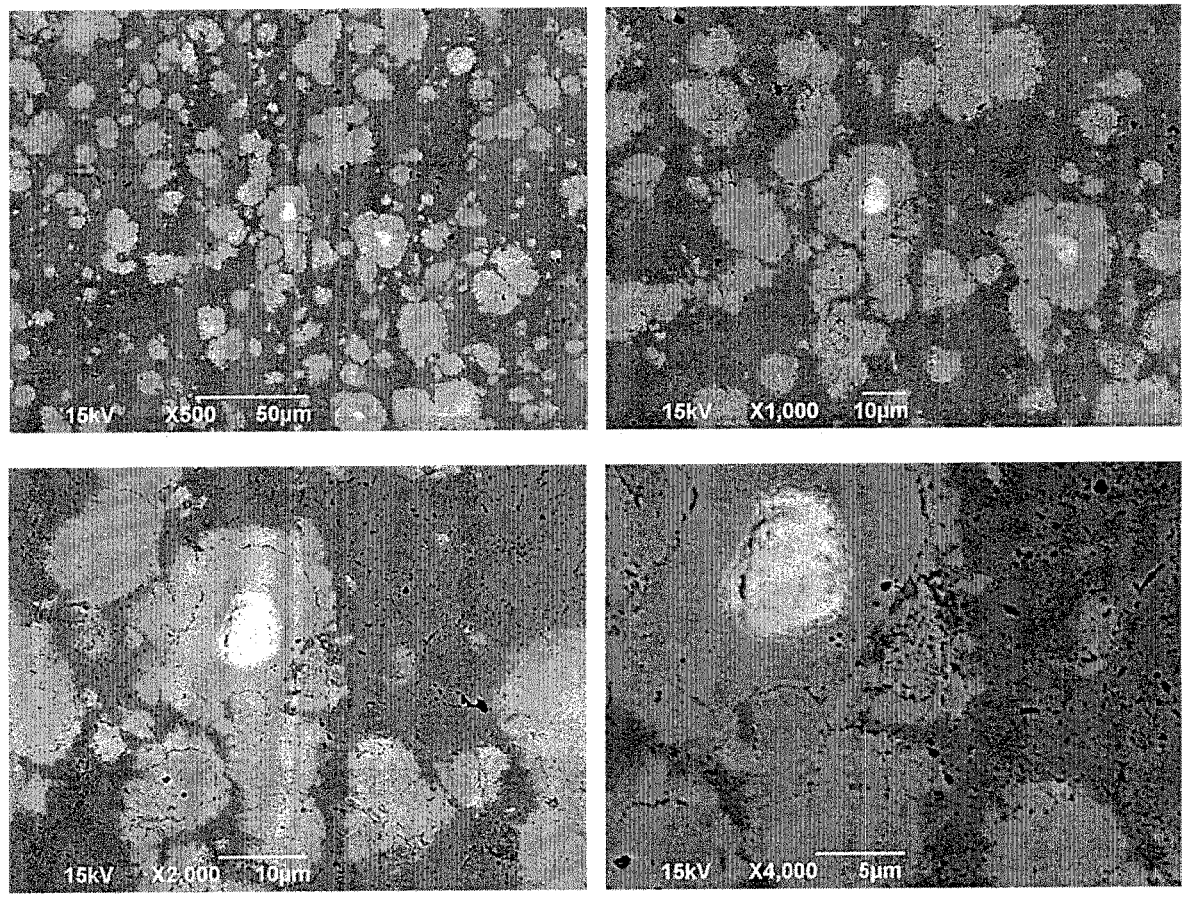
FIG. 12 illustrates SEM-BEI images of a section in Experimental Example 4-3.
Figure 13:
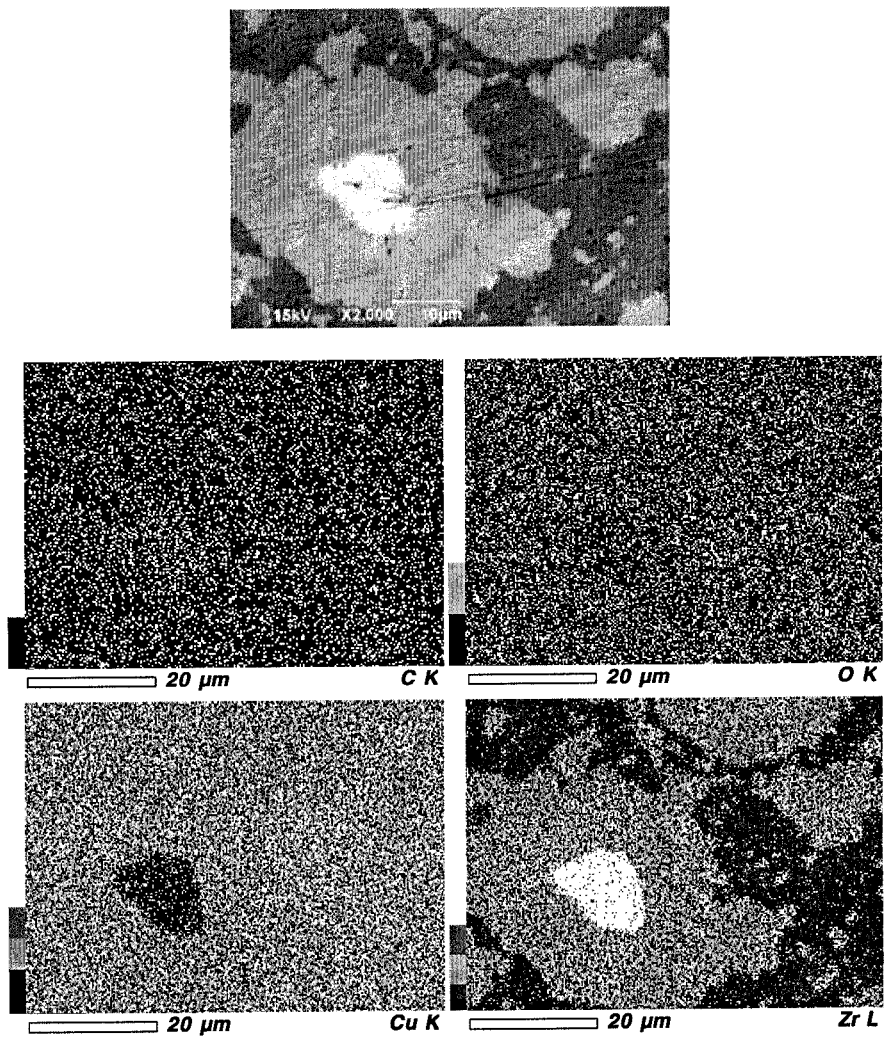
FIG. 13 illustrates a SEM-BEI image of a section in Experimental Example 4 and elemental maps measured by an EDX method.
Figure 14A:
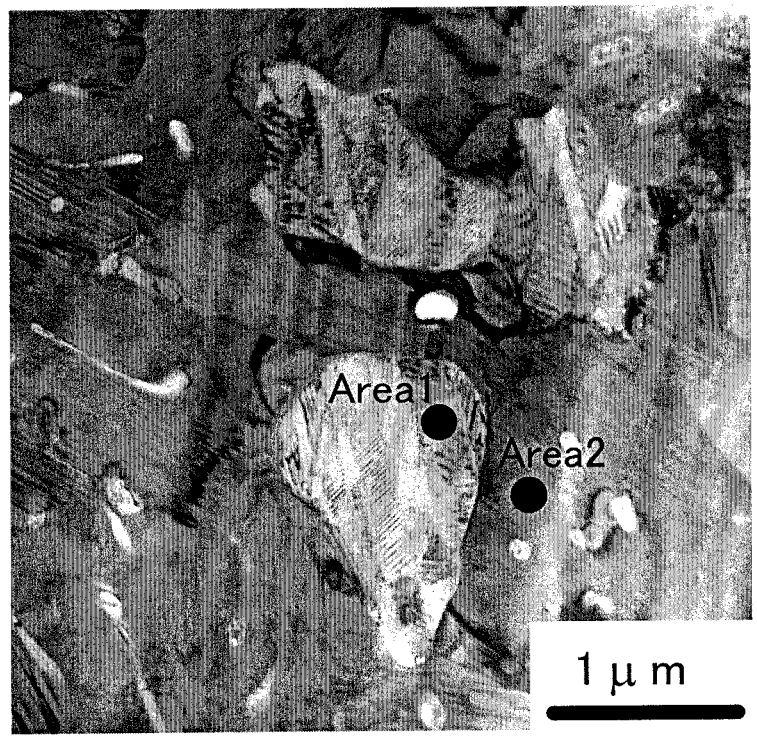
FIGS. 14A to 14C illustrate a TEM-BF image and SAD patterns of a section in Experimental Example 4-3.
Figure 14B:
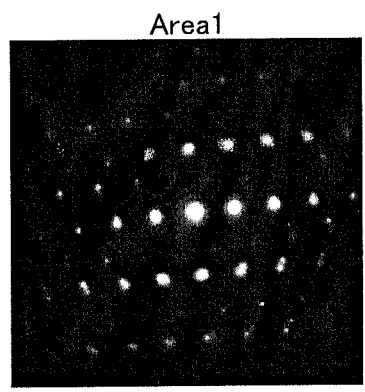
Figure 14C:
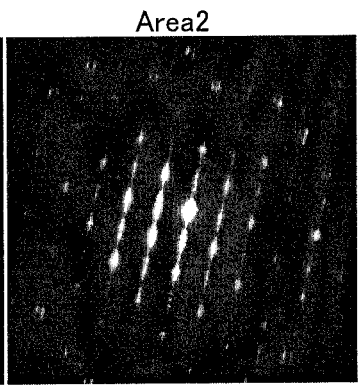

Next, Experimental Example 4 was investigated in detail. FIG. 12 illustrates SEM-BEI images of a section in Experimental Example 4-3. The average grain size D50 of the second phase was determined from the taken SEM images in the same manner as above. As illustrated in the SEM images in FIG. 12, in the copper alloy in Experimental Example 4, the average grain size D50 of the second phase in sectional view was found to be in the range of 1 µm to 100 µm. It was also found that the second phase included a Cu—Zr compound phase containing $Cu_5Zr$ in the outer shell of a coarse grain and a Zr-rich Zr phase in the central core. FIG. 13 illustrates a SEM-BEI image of a section in Experimental Example 4 and elemental maps obtained by an EDX method. As illustrated in FIG. 13, the central core of the second phase was assumed to be a Zr-rich Zr phase in which the Cu content was low and the Zr content was extremely high. FIG. 14A illustrates a TEM-BF image of a section in Experimental Example 4-3, FIG. 14B illustrates a SAD pattern of Area 1, and FIG. 14C illustrates a SAD pattern of Area 2. In the $Cu_5Zr$ compound phase of the SPS material in FIGS. 14A to 14C, a microstructure having twin crystals therein was also observed. FIG. 14B illustrates a SAD (selected area diffraction) pattern of Area 1 in the microstructure illustrated in FIG. 14A, and FIG. 14C illustrates a SAD pattern of Area 2 in the microstructure illustrated in FIG. 14A. The selected area aperture was 200 nm. EDX analysis was also performed in the central portion of each Area. As a result, the microstructure observed in Area 1 was a Zr-rich phase having a Cu content of 5 at % as in the case of the SPS material in Experimental Example 3, and the measured three interplanar spacings matched the interplanar spacing of the α-Zr phase with a difference of 1.2% or less. The compound phase of Area 2 was the same $Cu_5Zr$ compound phase as that of the SPS materials in Experimental Examples 1 and 3.

As is clear from the above description, in Experimental Examples 3 and 4, the conductivity and the mechanical strength can be further increased through a simpler process that uses, as a raw material, a Cu—Zr master alloy or $ZrH_2$ having relatively high chemical stability. Thus, a copper alloy comparable to that in Experimental Example 1 having high wear resistance can be produced.

Next, Examples in which a conductive supporting member including an inner portion and an outer portion was produced will be described.

Example 1

Figure 15:
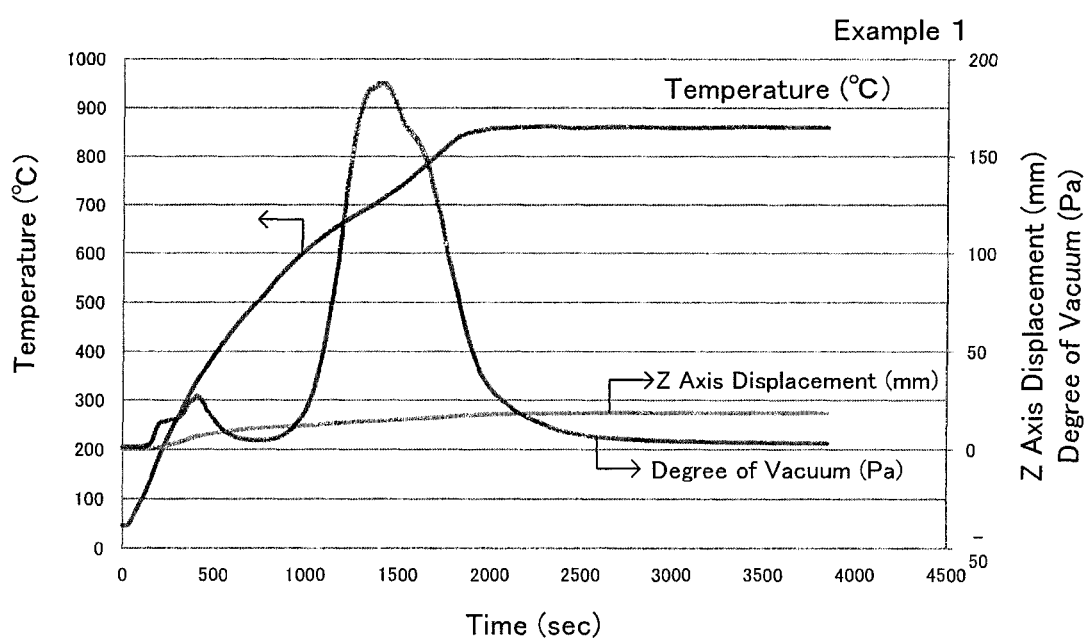
FIG. 15 illustrates SPS conditions of a conductive supporting member in Example 1.

A cylindrical partition having a diameter of 10 mm was formed in a graphite die having a cavity with an inside diameter of 26 mm and a height of 10 mm. A space on the inner side of the partition was filled with 14.0 g of a Cu powder (average particle size 75 µm), and a space on the outer side of the partition was filled with 75.2 g of a Cu powder (average grain size 75 µm) and a $ZrH_2$ powder so that an alloy composition represented by Cu-xZr (x=5.0 at %) was satisfied. The partition was removed. A punch was inserted into the graphite die, and SPS was performed using a spark plasma sintering apparatus (Model: SPS-210LX) manufactured by SPS SYNTEX Inc. The SPS was performed by applying a pulsed direct current of 3 kA to 4 kA at a heating rate of 0.4 K/s at a sintering temperature of 1153 K (about 0.9 Tm; Tm refers to a melting point of alloy) for a holding time of 15 minutes at a pressure of 20 MPa to obtain a composite member in Example 1. FIG. 15 illustrates the SPS conditions of the conductive supporting member in Example 1.

Examples 2 to 4

Figure 16:
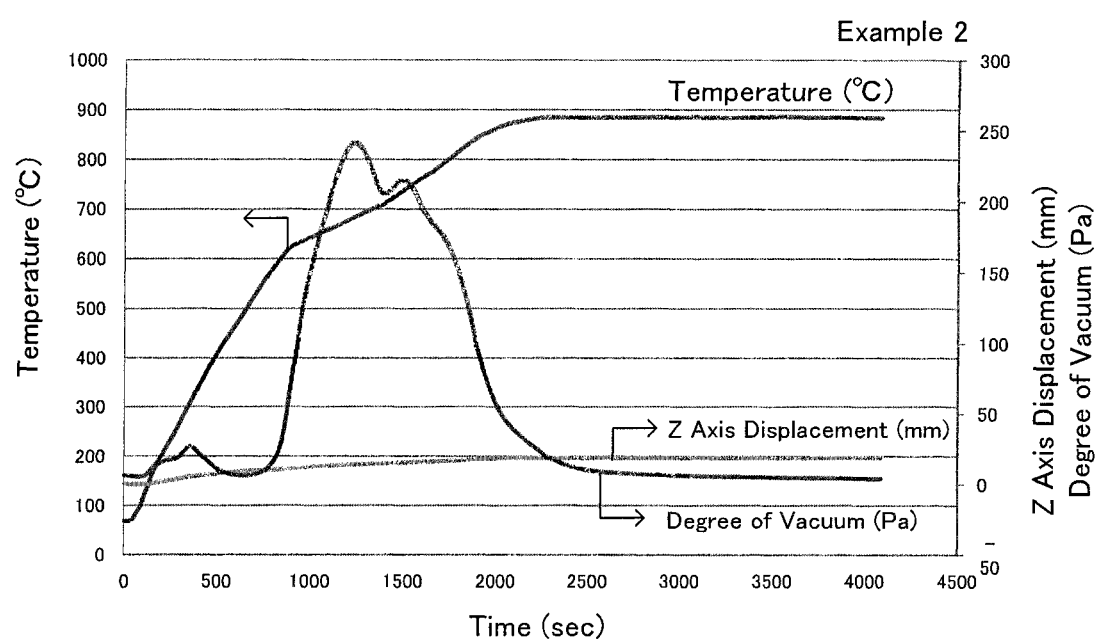
FIG. 16 illustrates SPS conditions of a conductive supporting member in Example 2.

A member in Example 2 was obtained through the same process as in Example 1, except that the Cu powder (average particle size 75 µm) and the $ZrH_2$ powder were mixed so that the composition of the outer portion was changed to an alloy composition represented by Cu-xZr (x=8.6 at %). FIG. 16 illustrates the SPS conditions of the conductive supporting member in Example 2. A member in Example 3 was obtained through the same process as in Example 1, except that the Cu powder (average particle size 75 µm) and the $ZrH_2$ powder were mixed so that the composition of the outer portion was changed to an alloy composition represented by Cu-xZr (x=15.2 at %) and a round bar made of pure copper was used as the inner portion. A member in Example 4 was obtained through the same process as in Example 1, except that the Cu powder (average particle size 75 µm) and the $ZrH_2$ powder were mixed so that the composition of the outer portion was changed to an alloy composition represented by Cu-xZr (x=16.7 at %) and a round bar made of pure copper was used as the inner portion.

Comparative Example 1

A Cu—Be—Co alloy containing 1.90 mass % of Be and 0.20 mass % of Co with the balance being Cu was melted and cast, and then cold rolling and solution treatment were performed. The resulting product was processed into the same shape as that in Example 1 to obtain a member in Comparative Example 1.

(Measurement of Conductivity and Hardness)

The conductivity of the inner portion and the outer portion was measured. Furthermore, the hardness of the Cu—Zr compound grains in the inner portion and the outer portion was measured in the same manner as above and converted to Vickers hardness in the same manner as in Experimental Examples.

(Results and Consideration)

Figure 17:
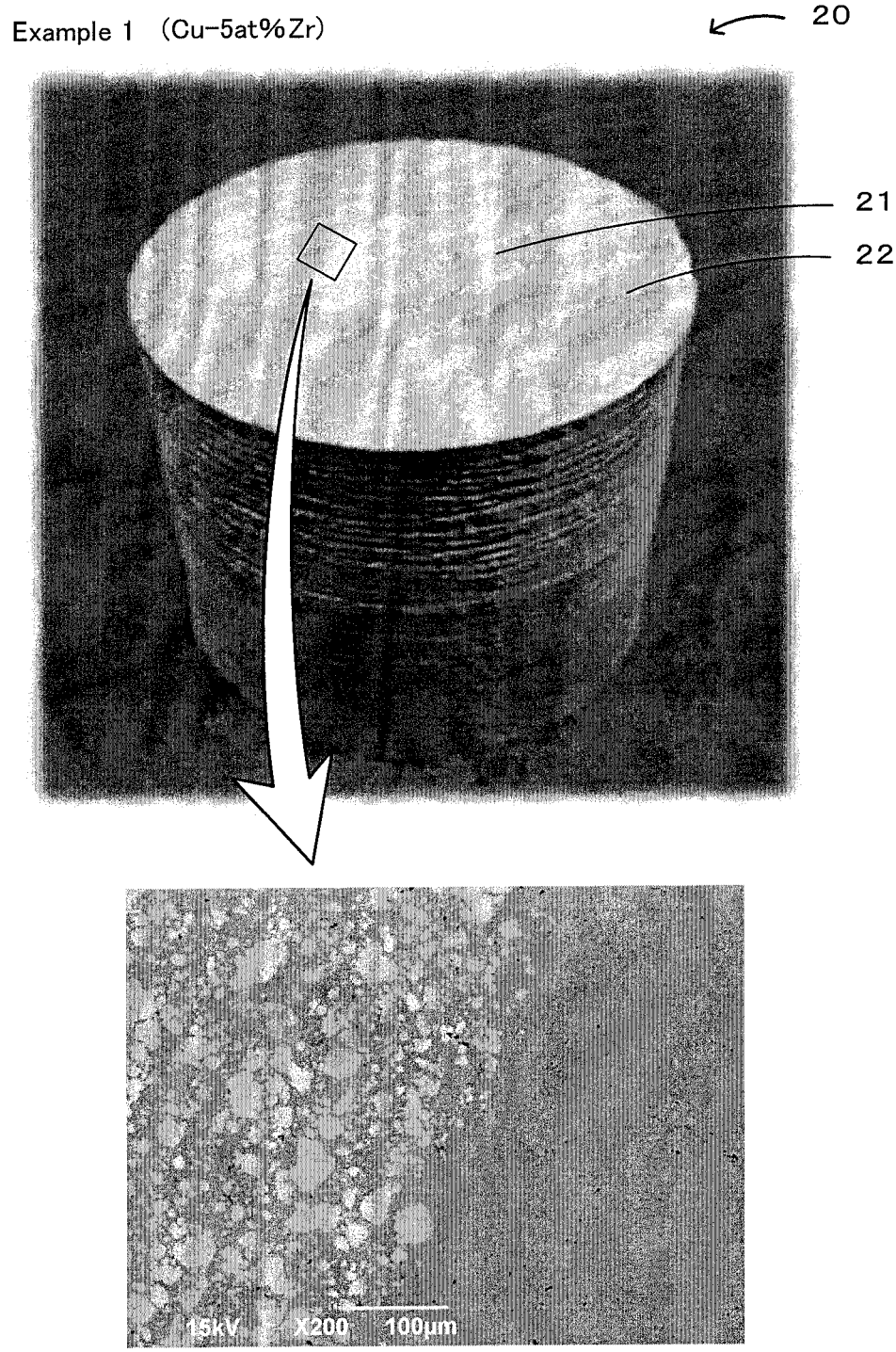
FIG. 17 illustrates a photograph of a conductive supporting member in Example 1 and a SEM image of a section of the conductive supporting member.
Figure 18:
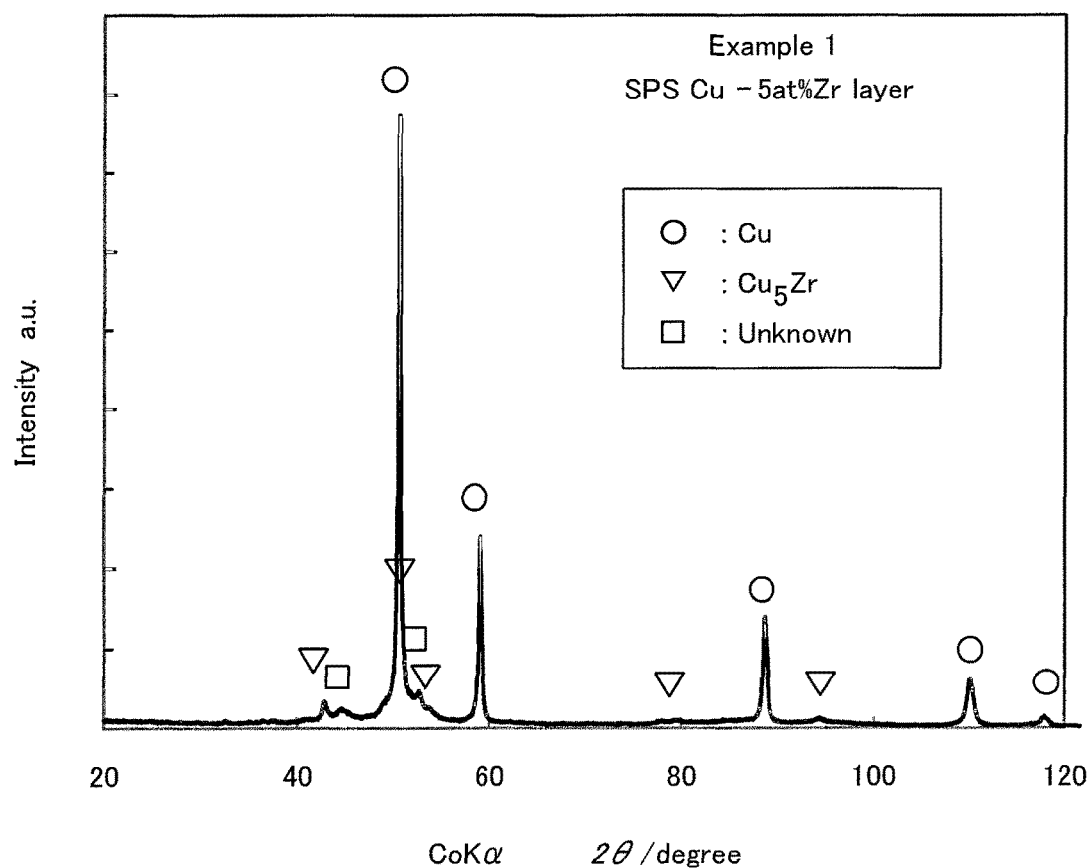
FIG. 18 illustrates measurement results of XRD in Example 1.
Figure 19:
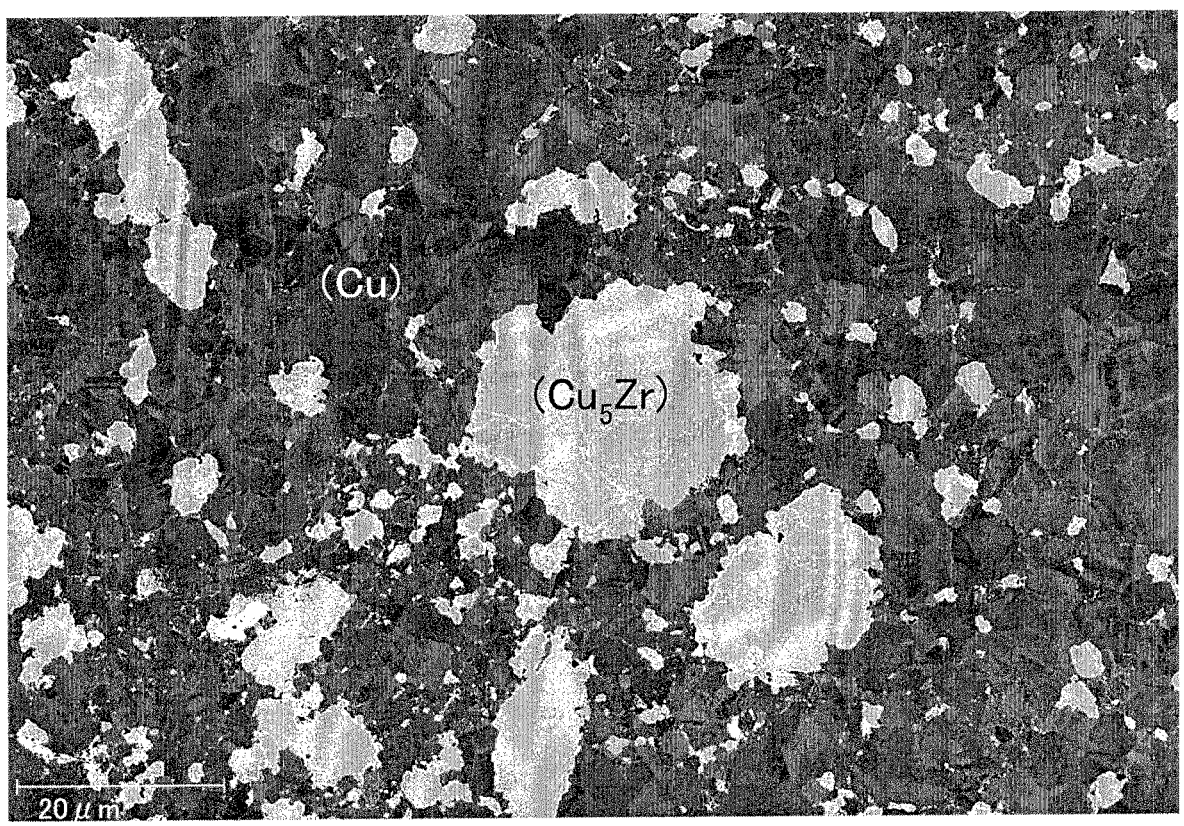
FIG. 19 illustrates a SEM-BEI image of a section of an outer portion in Example 1.
Figure 20:
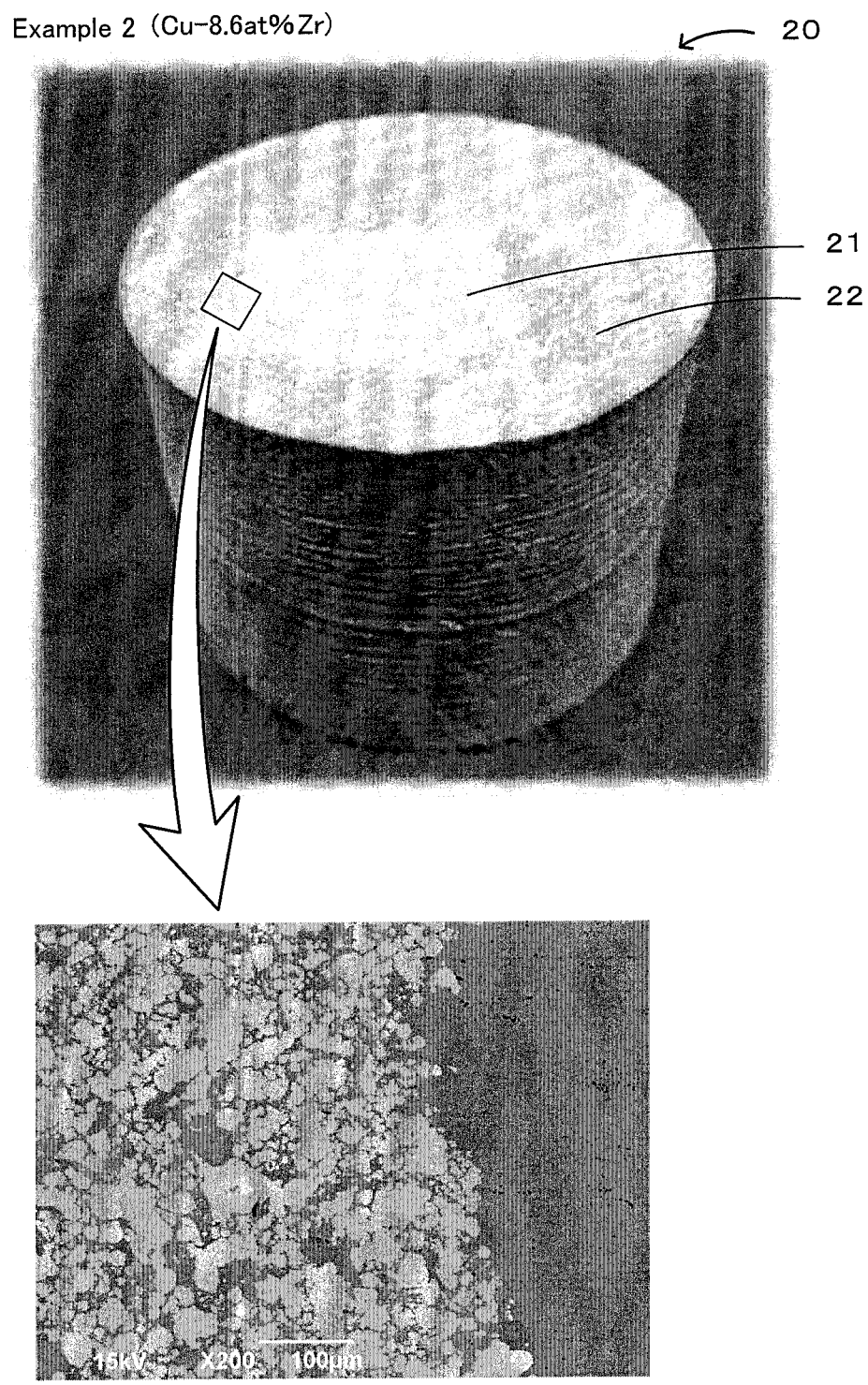
FIG. 20 illustrates a photograph of a conductive supporting member in Example 2 and a SEM image of a section of the conductive supporting member.
Figure 21:
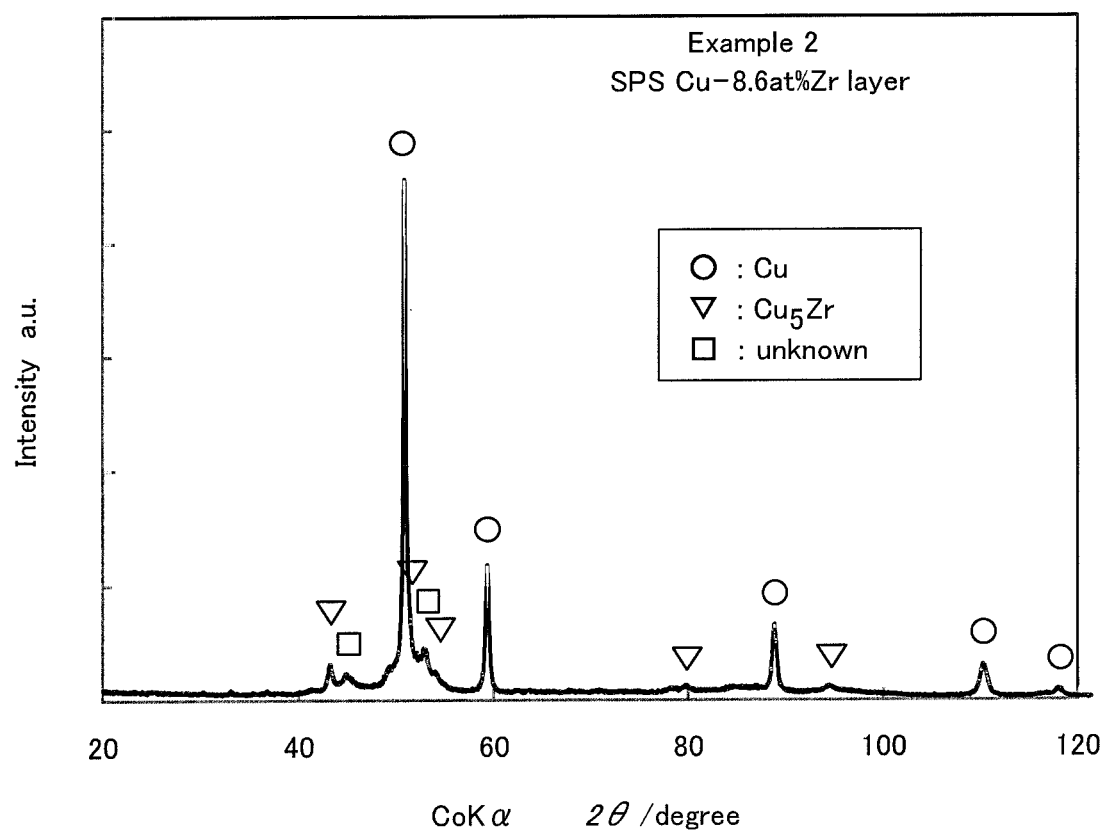
FIG. 21 illustrates measurement results of XRD in Example 2.
Figure 22:
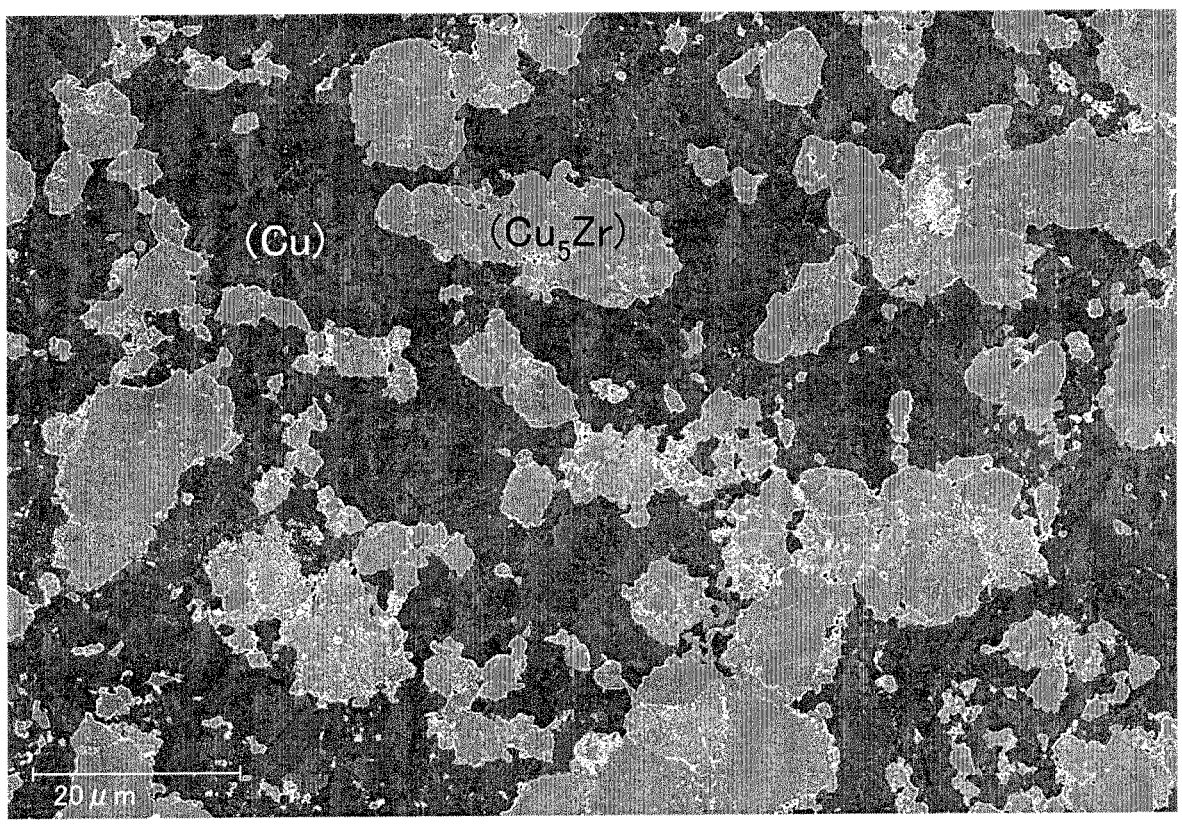
FIG. 22 illustrates a SEM-BEI image of a section of an outer portion in Example 2.

FIG. 17 illustrates a photograph of the conductive supporting member in Example 1 and a SEM image of a section of the conductive supporting member. FIG. 18 illustrates the measurement results of XRD in Example 1. FIG. 19 illustrates a SEM image of a section of the outer portion in Example 1. FIG. 20 illustrates a photograph of the conductive supporting member in Example 2 and a SEM image of a section of the conductive supporting member. FIG. 21 illustrates the measurement results of XRD in Example 2. FIG. 22 illustrates a SEM image of a section of the outer portion in Example 2. FIG. 23A illustrates a SEM image of a section at a boundary between the inner portion and the outer portion in Example 1. FIG. 23B illustrates a SEM image of a section at a boundary between the inner portion and the outer portion in Example 2. FIG. 23C illustrates a SEM image of a section at a boundary between the inner portion and the outer portion in Example 3. FIG. 23D illustrates an enlarged image of a grain boundary in Example 3. Table 2 collectively shows the details of the samples in Examples 1 and 2 and the conductivity (% IACS) and hardness (MHv) in terms of Vickers hardness of the inner portion and the outer portion. Table 3 collectively shows the conductivity, Vickers hardness, and Young's modulus of the entire outer portion and a Zr compound portion in Examples 1 to 4 and the conductivity, Vickers hardness, and Young's modulus in Comparative Example 1. As illustrated in FIGS. 17 and 20, the members including an inner portion and an outer portion could be produced through the above processes. The conductivity of each of the inner portions in Examples 1 and 2 was found to be as high as 99% IACS. The conductivities of the outer portions in Examples 1 and 2 were found to be 53% IACS and 32% IACS, respectively, which were sufficient conductivities. The hardness of the inner portion in terms of Vickers hardness was 67 MHv in Example 1 and 76 MHv in Example 2 whereas the hardness of each of the Cu—Zr compound phases in the outer portions in Examples 1 and 2 was as high as 670 MHv or more.

Figure 23:
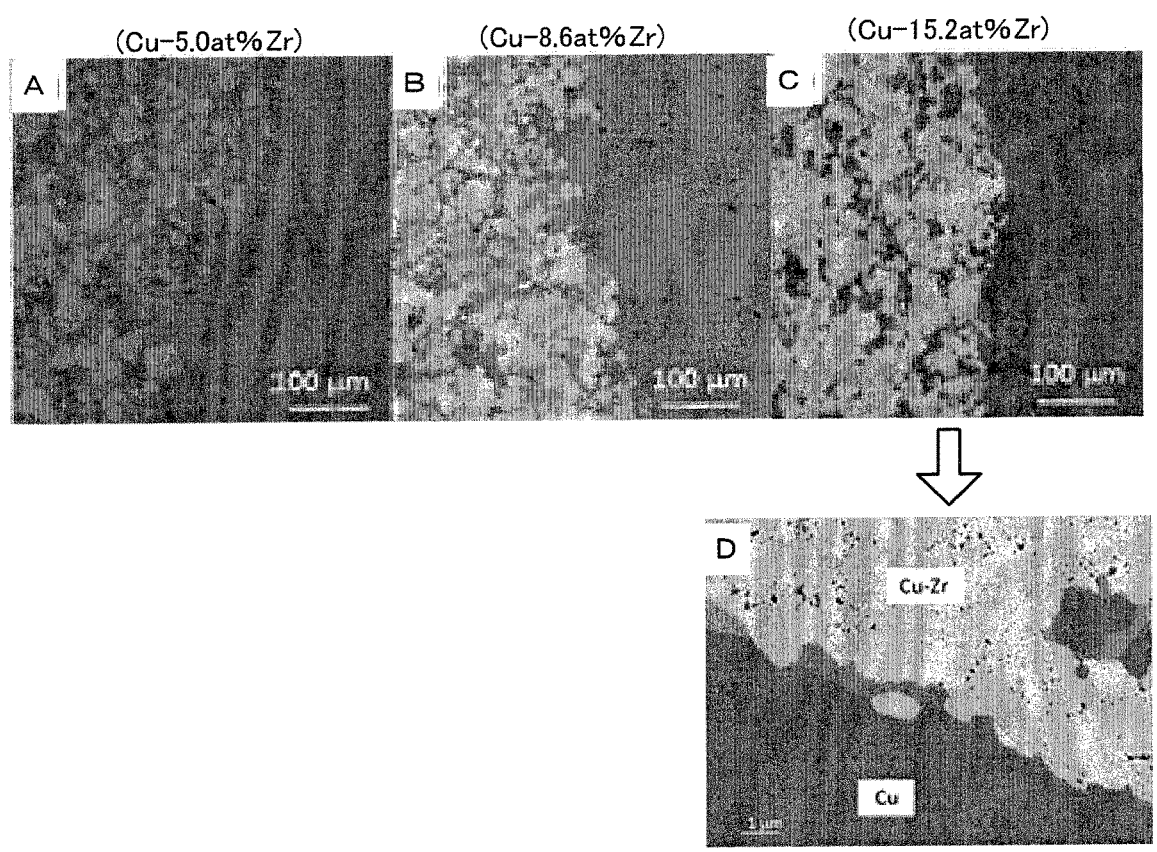
FIG. 23 illustrates SEM images of sections in Examples 1 to 3 at a boundary between an inner portion and an outer portion.

In Examples 1 and 2, as illustrated in FIGS. 18 and 21, X-ray diffraction peaks of Cu and a Cu—Zr compound ($Cu_5Zr$) were observed. Furthermore, as illustrated in FIGS. 19 and 22, the structure of the outer portion was the same as the structure investigated in Experimental Examples, and the outer portion included a Cu matrix phase and a second phase that was dispersed in the Cu matrix phase and contained a Cu—Zr compound. As shown in Table 3, in Examples 1 to 4, the entire conductivity tended to decrease as the Zr content increased, but the hardness and the strength were assumed to be further increased because the content of the Zr compound having high Vickers hardness was increased. In each of the sintered bodies in FIG. 23, the outer portion (left) had a phase including a Cu matrix phase and a second phase containing a Cu—Zr compound ($Cu_5Zr$) and the inner portion (right) had a Cu phase. As illustrated in FIG. 23, as the amount of Zr added was increased, the amount of the $Cu_5Zr$ compound phase in the outer portion that was brightly observed was increased and the state was changed from a nonuniformly dispersed state to an uneven closely-packed state. On the other hand, the amount of a Cu phase generated around the $Cu_5Zr$ compound phase was decreased. In all the compositions, traces considered to be oxides were confirmed, but pores were not observed, which showed that a dense structure was obtained. As illustrated in FIG. 23D, also in Example 3, the outer portion included a Cu phase interspersed in the $Cu_5Zr$ compound phase. Furthermore, an interface such as a reaction layer that has a different crystal structure and blocks the flow of current was not confirmed between the outer portion and the inner portion, and the outer portion and the inner portion were in close contact with each other through a diffusion layer. In Example 4, the outer portion included a Cu matrix phase and a second phase that was dispersed in the Cu matrix phase and contained a Cu—Zr compound and the inner portion included a Cu phase as in other Examples. Such a member was assumed to be suitable as, for example, a shank for welding members and a socket for tip electrodes, which were required to have high conductivity and high strength.

TABLE 2

|  | Outer Portion | | | Inner Portion | | |
| --- | --- | --- | --- | --- | --- | --- |
|  | Composition | Conductivity % IACS | Vickers Hardness MHv | Composition | Conductivity % IACS | Vickers Hardness MHv |
| Example 1 | Cu—xZr (x = 5.0 at %) | 53 | Over 670 | Cu | 99 | 67 |
| Example 2 | Cu—xZr (x = 8.6 at %) | 32 | Over 670 | Cu | 99 | 76 |

TABLE 3

|  | Composition (Xat %) | Total Amount | | | Zr Compound Portion | | |
| --- | --- | --- | --- | --- | --- | --- | --- |
|  |  | Conductivity % IACS | Vickers Hardness MHv | Young's Modulus GPa | Conductivity % IACS | Vickers Hardness MHv | Young's Modulus GPa |
| Example 1 | Cu—xZr (5.0) | 72 | — | — | 51 | 585 | 159.5 |
| Example 2 | Cu—xZr (8.6) | 61 | — | — | 32 | 585 | 159.5 |
| Example 3 | Cu—xZr (15.2) | 51 | — | — | 14 | 585 | 159.5 |
| Example 4 | Cu—xZr (16.7) | 44 | — | — | 8 | 585 | 159.5 |
| Comparative Example 1 | CuBeCo | 25 | 360 | 129 | — | — | — |

The present invention is not limited to Examples described above. It is obvious that various embodiments can be made without departing from the technical scope of the present invention.

The present application claims priority from Japanese Patent Application No. 2016-234067, filed on Dec. 1, 2016, the entire contents of which are incorporated herein by reference.

What is claimed is:

1. A method for producing an electrically conductive supporting member that includes an outer portion and an inner portion that is present on an inner side of the outer portion and that has a higher electrical conductivity than the outer portion, the method comprising:
a sintering step of arranging a raw material containing Cu for the inner portion to be formed so as to have a higher electrical conductivity than the outer portion, arranging, on an outer side of the raw material for the inner portion, a raw material powder for the outer portion to be formed, the raw material powder for the outer portion being prepared with a mixed powder of Cu and a Cu—Zr master alloy or a mixed powder of Cu and $ZrH_2$ so as to have an alloy composition represented by Cu-xZr, with x being an atomic % of Zr and $0.5 \leq x \leq 16.7$ is satisfied, holding a mixed powder at a particular temperature lower than a Cu—Zr eutectic point while a particular pressure is applied, and performing spark plasma sintering on the mixed powder.

2. The method for producing an electrically conductive supporting member according to claim 1, wherein in the sintering step, the Cu—Zr master alloy has a Cu content of 50 mass %.

3. The method for producing an electrically conductive supporting member according to claim 1, wherein in the sintering step, the raw material for the inner portion and the mixed powder raw material for the outer portion are inserted into a graphite die and subjected to the spark plasma sintering in a vacuum.

4. The method for producing an electrically conductive supporting member according to claim 1, wherein in the sintering step, the spark plasma sintering is performed at the particular temperature, the particular temperature being lower than the Cu—Zr eutectic point by 400° C. to 5° C.

5. The method for producing an electrically conductive supporting member according to claim 1, wherein in the sintering step, the spark plasma sintering is performed at the particular pressure, the particular pressure being 10 MPa or more and 60 MPa or less.

6. The method for producing an electrically conductive supporting member according to claim 1, wherein in the sintering step, the spark plasma sintering is performed for a holding time of 10 minutes or longer and 100 minutes or shorter.

7. The method for producing electrically conductive supporting member according to claim 1, wherein in the sintering step, a raw material for a working layer having a hardness that is lower than the hardness of the outer portion is arranged on an outer peripheral surface of the outer portion and sintered.

8. The method for producing an electrically conductive supporting member according to claim 1, wherein the electrically conductive supporting member is a member used for an arm unit of a welding electrode, the electrically conductive supporting member being a shank that is interposed between a tip electrode and a tip holder to hold the tip electrode.

* * * * *